US006054831A

United States Patent [19]

Moore et al.

[11] Patent Number: 6,054,831

[45] Date of Patent: Apr. 25, 2000

[54] RADIO FREQUENCY REMOTE CONTROL FOR TROLLING MOTORS

[75] Inventors: Prentice G. Moore, Starkville; Thomas C. Griffith, Europa, both of Miss.; Loy Hoskins, Washington, Ark.; William Mitchell, Hagerstown, Md.; Michael Shives, Smithbury, Md.; Nick G. IntVeldt, Frederick, Md.

[73] Assignee: Zebco Corporation, Tulsa, Okla.

[21] Appl. No.: 09/047,101

[22] Filed: Mar. 24, 1998

[51] Int. Cl.$^{7}$ .................................................... B64C 13/20

[52] U.S. Cl. ........................ 318/581; 318/16; 114/144 R; 440/6; 440/7; 340/825.69

[58] Field of Search ................ 318/16, 581; 114/144 R; 440/6, 7; 340/825.69

[56] References Cited

U.S. PATENT DOCUMENTS

| | | | |
|---|---|---|---|
| 2,891,156 | 6/1959 | Crow . | |
| 3,387,582 | 6/1968 | Reeves . | |
| 3,689,927 | 9/1972 | Boston . | |
| 3,952,681 | 4/1976 | Tucker . | |
| 3,976,023 | 8/1976 | Noguchi et al. . | |
| 3,980,039 | 9/1976 | Henning . | |
| 4,086,724 | 5/1978 | McCaslin . | |
| 4,152,703 | 5/1979 | Ziemke et al. . | |
| 4,161,077 | 7/1979 | Ciaccio et al. . | |
| 4,207,959 | 6/1980 | Youdin et al. . | |
| 4,565,529 | 1/1986 | Aertker et al. . | |
| 4,614,900 | 9/1986 | Young . | |
| 4,706,086 | 11/1987 | Panizza | 318/16 |
| 4,717,364 | 1/1988 | Furukawa . | |
| 4,725,956 | 2/1988 | Jenkins . | |
| 4,824,408 | 4/1989 | Aertker et al. . | |
| 4,971,583 | 11/1990 | Umehara . | |
| 4,988,992 | 1/1991 | Heitschel et al. | 340/825.69 |
| 4,989,253 | 1/1991 | Liang et al. . | |
| 5,050,519 | 9/1991 | Senften . | |
| 5,069,642 | 12/1991 | Henderson . | |
| 5,078,070 | 1/1992 | Clement . | |
| 5,088,943 | 2/1992 | Henderson . | |
| 5,108,322 | 4/1992 | Henderson . | |
| 5,112,256 | 5/1992 | Clement . | |
| 5,129,845 | 7/1992 | Henderson . | |
| 5,152,703 | 10/1992 | Clement . | |
| 5,171,173 | 12/1992 | Henderson et al. . | |
| 5,406,492 | 4/1995 | Suzuki . | |
| 5,410,486 | 4/1995 | Kishi et al. . | |

*Primary Examiner*—Karen Masih
*Attorney, Agent, or Firm*—Wood, Phillips, VanSanten, Clark & Mortimer

[57] ABSTRACT

A trolling motor system comprises a trolling motor having a propeller rotatably driven thereby. The motor is connected to a rotating tube or column mounted to the boat. A control head is mounted at the upper end of the column. A steering motor in the control head controls rotational position of the trolling motor. The control head houses a control circuit for controlling speed of the trolling motor as well as position of the steering motor to steer the boat. A foot pedal is positioned in the boat in proximity to the control head. The foot pedal includes a plurality of user actuable switches for commanding operation of the steering motor and trolling motor. The commands are transmitted via radio frequency to a receiver in the control head. The receiver decodes the commands and transfers the command to the control circuit.

81 Claims, 34 Drawing Sheets

RADIO FREQUENCY REMOTE CONTROL FOR TROLLING MOTORS

FIELD OF THE INVENTION

This invention relates to trolling motors and, more particularly, to a radio frequency remote control for trolling motors.

BACKGROUND OF THE INVENTION

Trolling motors have long been used by fishermen and other boaters as an auxiliary motor on a boat for propelling the boat short distances and to provide precise positioning of the boat. Some trolling motors are hand steered while others offer a combination of hand and foot steering operation.

One known form of trolling motor uses a foot pedal including a foot pad connected to a rigid cable. The rigid cable is connected to a gear mechanism and a trolling motor control head, such as through a rack and pinion, which in turn rotates the trolling motor to provide steering. Speed control is effected electrically by a horizontal sliding movement of the foot pad to rotate a knob which actuates a potentiometer forming part of a speed control circuit.

An alternative form of trolling motor uses an electronic servo control. Such a foot pedal is disclosed in Henderson et al., U.S. Pat. No. 5,171,173, assigned to the assignee of the present application.

With each of the above trolling motors the foot pedal is hard wired or cabled to a control head for the trolling motor. The use of a cable or wire limits the positioning of the foot pedal relative to the control head. Also, the cable can become tangled or be a hazard to fishermen.

The present invention is directed to further improvements in trolling motor steering and speed control.

SUMMARY OF THE INVENTION

In accordance with the invention, a radio frequency remote control is provided for a trolling motor.

A trolling motor system comprises a trolling motor having a propeller rotatably driven thereby. The motor is connected to a rotating tube or column mounted to the boat. A control head is mounted at the upper end of the column. A steering motor in the control head controls rotational position of the trolling motor. The control head houses a control circuit for controlling speed of the trolling motor as well as position of the steering motor to steer the boat.

A foot pedal is positioned in the boat in proximity to the control head. The foot pedal includes a plurality of user actuable switches for commanding operation of the steering motor and trolling motor. The commands are transmitted via radio frequency to a receiver in the control head. The receiver decodes the commands and transfers the command to the control circuit.

It is an object of the invention to avoid the problem of two fishermen in proximity to one another remotely controlling the others trolling motor.

It is another object of the invention to permit two fishermen in the same boat to use two foot pedals to individually control the same trolling motor.

It is a further object of the invention to provide a low battery indication for the trolling motor and the foot pedal.

It is yet another object of the invention to shut down the transmitter to avoid battery drain if the user forgets to turn off the foot pedal.

It is yet another object of the invention to use frequency modulation as the transmission mode.

It is still another object of the invention to locate a foot pedal transmitter antenna in close proximity to a membrane switch panel, resulting in increasing the strength of the signal transmitted.

It is yet another object of the invention to provide the fisherman with an indication that the foot pedal is communication with the receiver of the trolling motor head.

It is yet another object of the invention to include a timer in the receiver circuit so that if the receiver ceases to receive a notification that a switch is still pressed within a specified time, the timer sends a signal to cancel the command.

It is yet another object of the invention to reduce torque on gears in the trolling motor by sensing stall current when the motor is turned off and causing the motor to momentarily turn back to relieve the torque condition.

It is still another object of the invention to modulate the steering control to a desired steering profile to provide a variable steering ratio.

It is yet a further object of the invention to automatically align the steering motor when it is placed in an operative position.

Further features and advantages of the invention will readily be apparent from the specification and from the drawings.

BRIEF DESCRIPTION OF THE DRAWINGS

FIGS. 15A and 5B comprise a speed control subroutine of the main routine of FIG. 11;

DETAILED DESCRIPTION OF THE INVENTION

The invention is directed to an electronic steer trolling motor with a membrane switch foot pedal control. The foot pedal could be connected either by cord or remotely using radio frequency or infrared transmission for trolling motor foot control.

An electric steer trolling motor is disclosed that can be easily converted to remote control. The control electronics senses if a cord or receiver is present and adjusts software for the appropriate foot pedal connection. A microprocessor controls all trolling motor functions when directed by a foot pedal. Thus, the output of the foot pedal or receiver is logic level signals.

Figure 1:
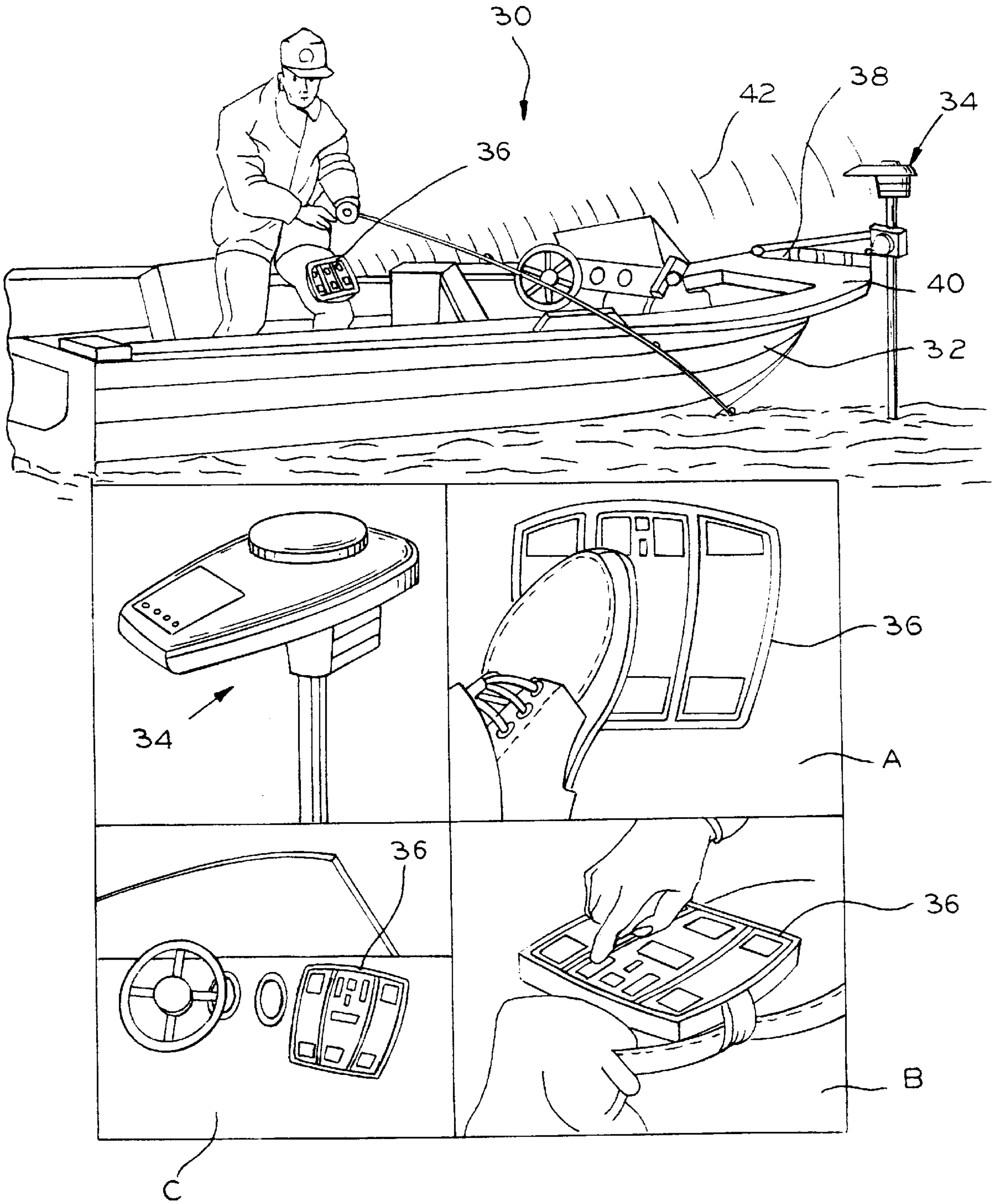
FIG. 1 is a perspective view of a fisherman in a boat including a trolling motor system using a radio frequency remote control in accordance with the invention and including insets showing a trolling motor and options for use of a foot pedal of the trolling motor system.

With reference to FIG. 1, a trolling motor system 30 in accordance with the invention is illustrated for use in connection with a boat 32. The system 30 includes a trolling motor 34 and foot pedal 36. The trolling motor 34 is mounted to the boat 32 using a linkage mounting mechanism 38 fastened to a deck 40 at the bow of the boat 32. The trolling motor 34 effects propulsion and steering of the boat 32. Alternatively, the trolling motor 34 could be stern mounted, as is apparent.

In accordance with the illustrated embodiment of the invention, the foot pedal 36 is remotely connected to the trolling motor 34 using radio frequency or infrared transmission for trolling motor control. Particularly, the foot pedal 36 may be deck mounted as illustrated in Inset A, strapped to a leg of the fisherman as illustrated in Inset B, or mounted to a dash of the boat, as illustrated in Inset C. The foot pedal 36 communicates by sending a radio frequency transmission, as represented by radio waves 42.

Figure 2:
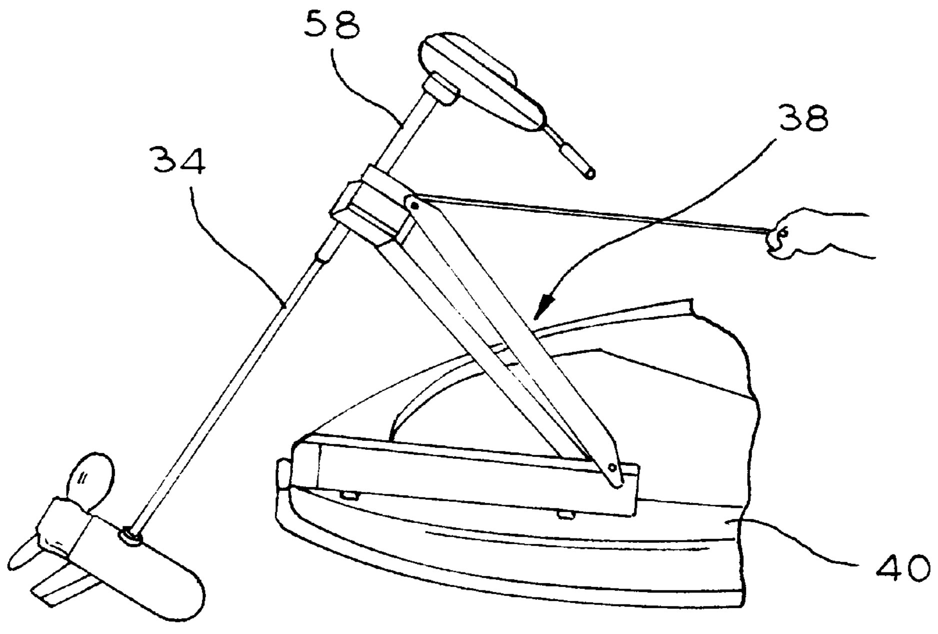
FIG. 2 is a partial perspective view illustrating movement of the trolling motor from an operative position to a stowed position.
Figure 3:
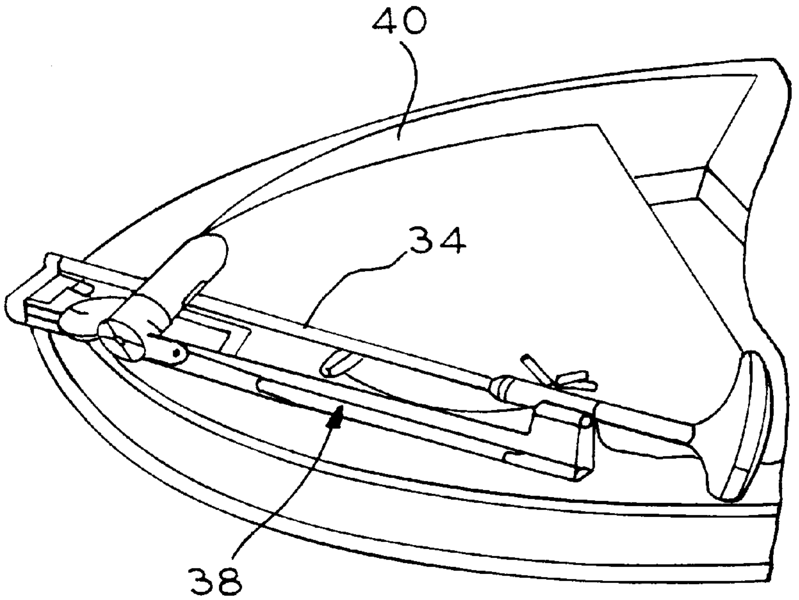
FIG. 3 is a perspective view similar to FIG. 2 illustrating the trolling motor in the stowed position.

Referring also to FIGS. 2 and 3, the linkage mechanism 38 is movable between the operative position shown in FIG. 1 with the trolling motor 34 generally vertical, and through a transition position illustrated in FIG. 2 with the trolling motor 34 at approximately a 45° angle, to a stowed position shown in FIG. 3 with the trolling motor 34 generally horizontal and resting on the linkage mechanism 38 and thus the deck 40.

Figure 4:
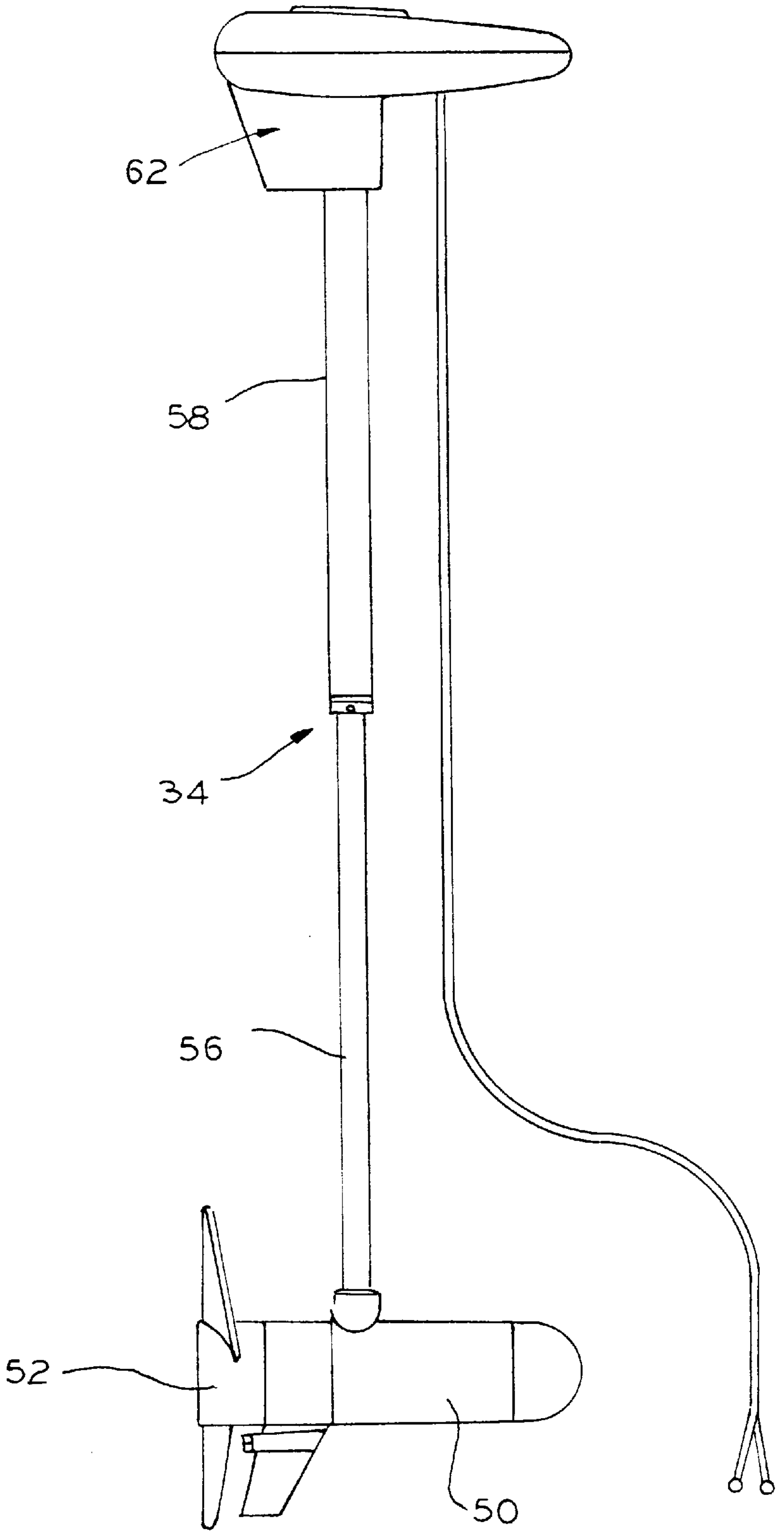
FIG. 4 is an elevation view of the trolling motor.
Figure 5A:
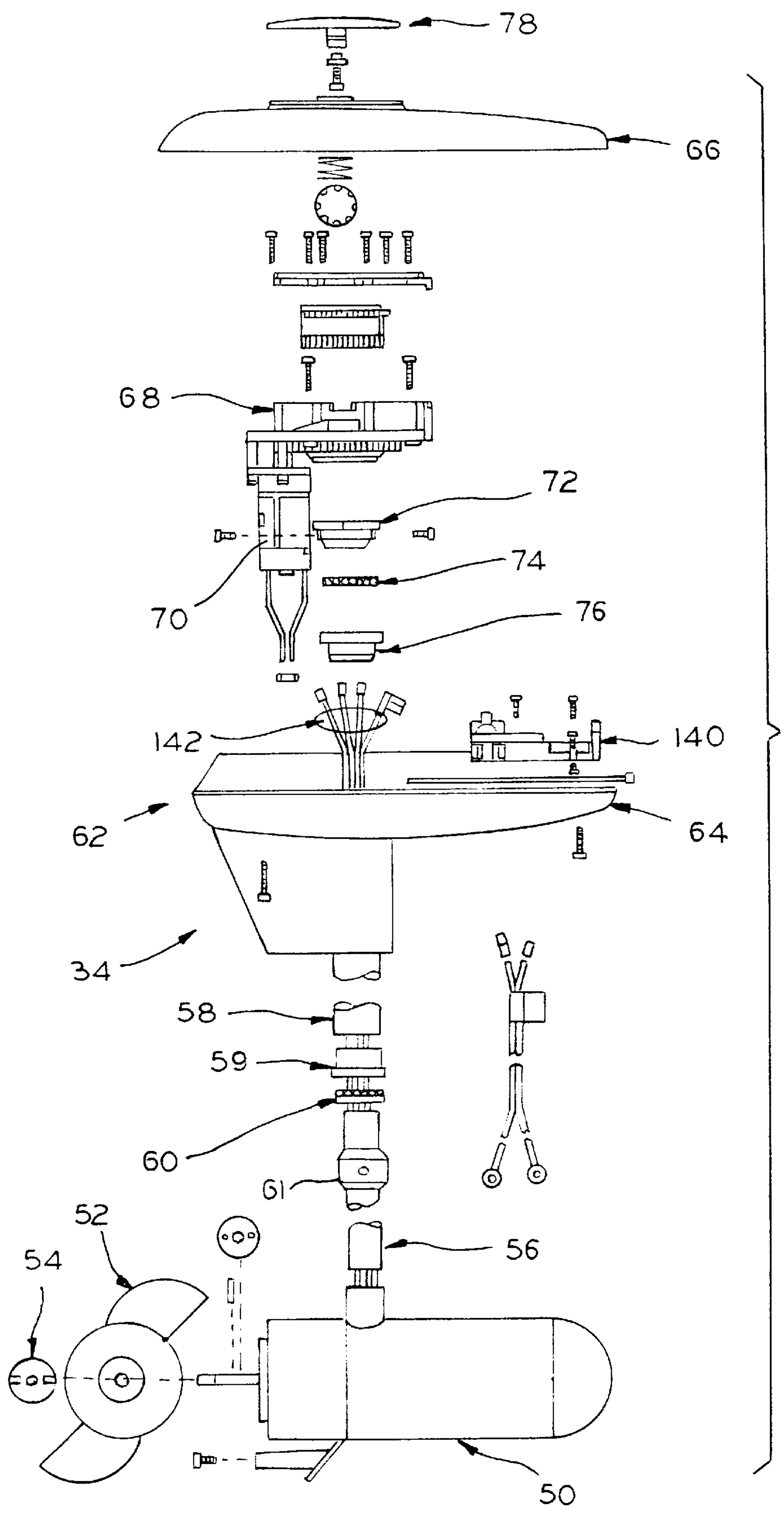
FIG. 5A is an exploded view of the trolling motor.
Figure 5B:
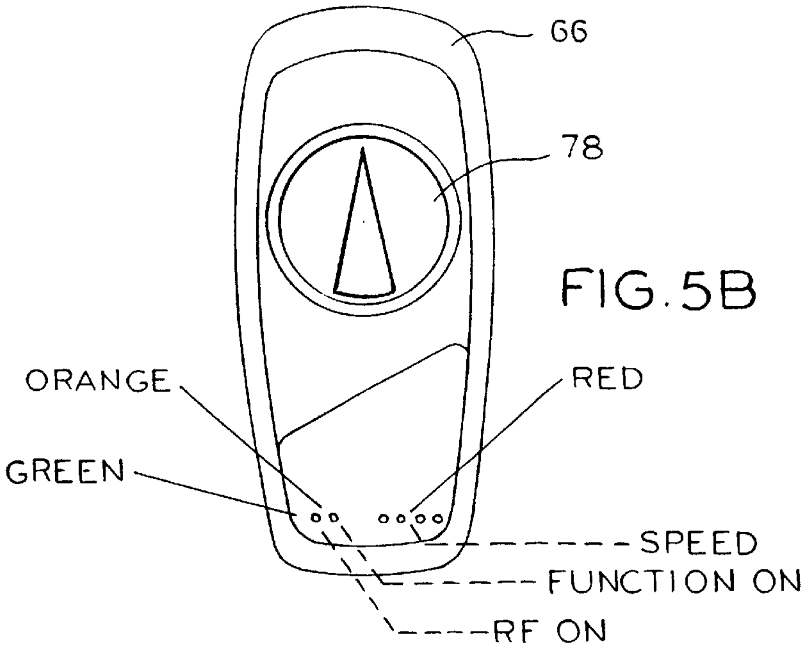
FIG. 5B is a plan view of the control head of the trolling motor.

Referring to FIGS. 4, 5A and 5B, the trolling motor 34 has a thrust motor 50 with a propeller 52 connected with a nut 54 rotatably driven thereby. The motor 50 is connected to a rotating tube or column 56 rotatably received in a fixed outer tube 58. A cup 59, bearing 60 and bearing collar 61 facilitate rotation of the column 56 in the fixed tube 58. The trolling motor 34 is mounted to the boat by mounting the fixed tube 58 to the linkage mechanism 38, as is illustrated above.

A control head 62 is mounted at the upper end of the fixed tube 58. The control head 62 houses a steering motor assembly 68 having a steering motor 70 and suitable gears operatively connected via a spring clutch 72, bearing 74 and cup 76 to the column 56.

Owing to the above-described relationship, rotation of the steering motor 70 in one direction rotates the column 56 at a reduced speed to steer the boat in that direction. Energizing the motor 70 in an opposite direction results in opposite rotation of the column 56 and thus steering the boat in an opposite direction. Mounted to the cover 66 is an indicator 78, see also FIG. 5B. The indicator 78 provides the operator with a quick reference of motor direction. Also mounted on the cover 66 are plural LED indicators. One LED indicates that an associated foot pedal is on and provides low battery voltage indication. Another LED indicates that the trolling motor is receiving commands from the foot pedal when any key is depressed. Speed LED indicators indicate the thrust level in increments of 10, 20, 50 and 70 percent of rated thrust. The speed LED's also provide a low voltage indication of the trolling motor battery, as discussed below.

Figure 6:
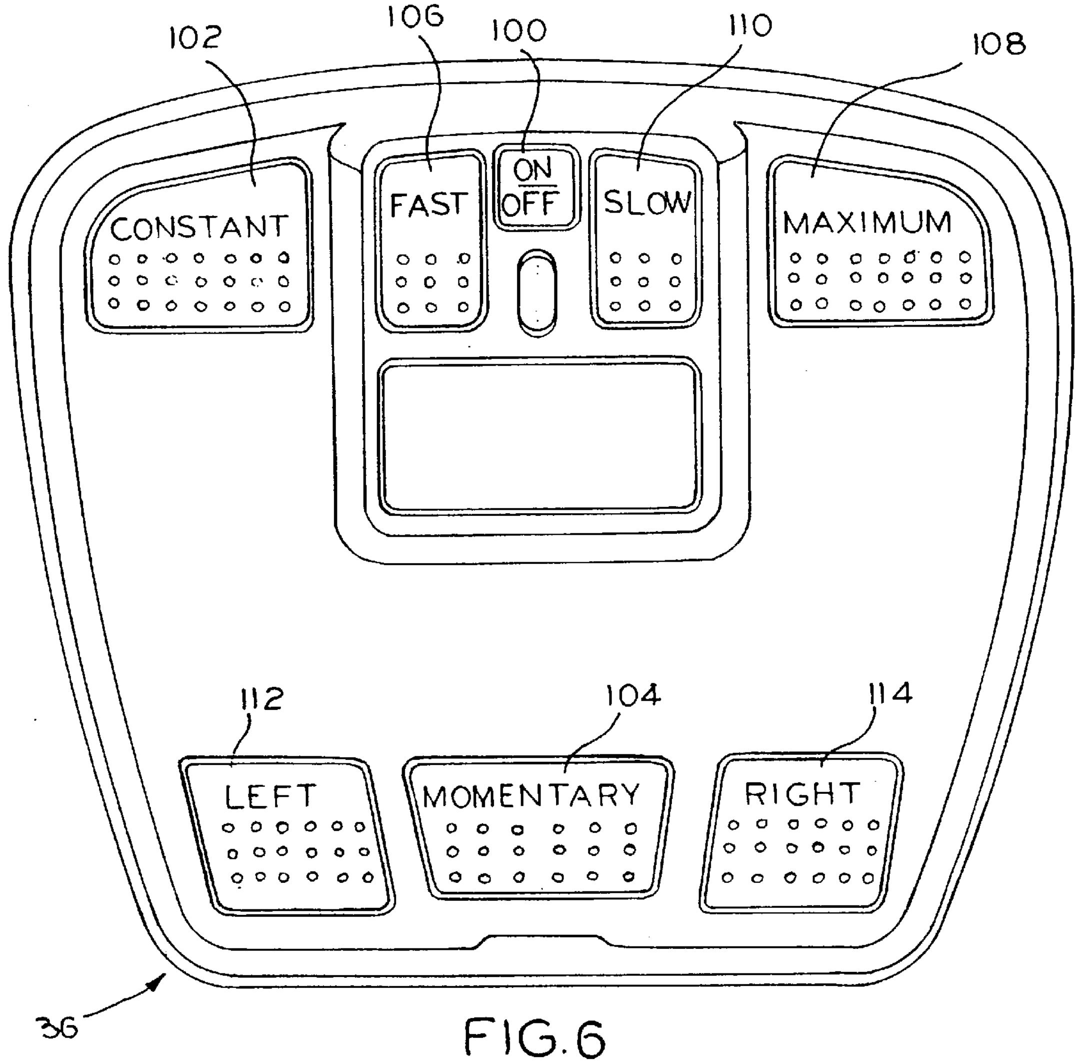
FIG. 6 is a plan view of the foot pedal.
Figure 7:
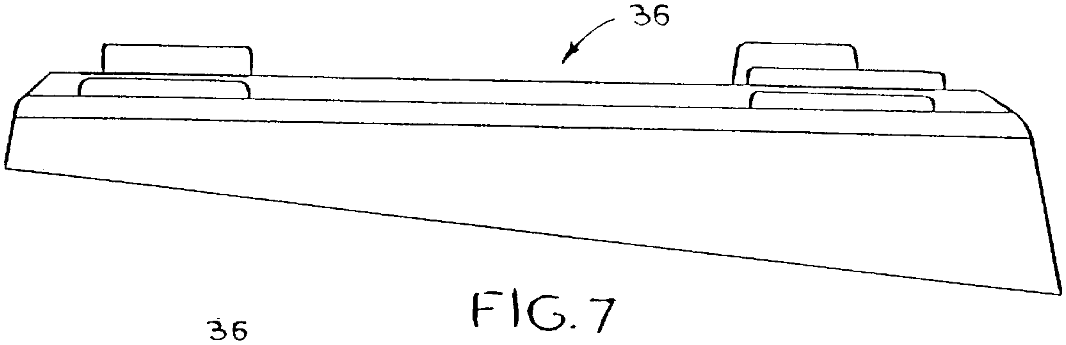
FIG. 7 is a side elevation view of the foot pedal.
Figure 7A:
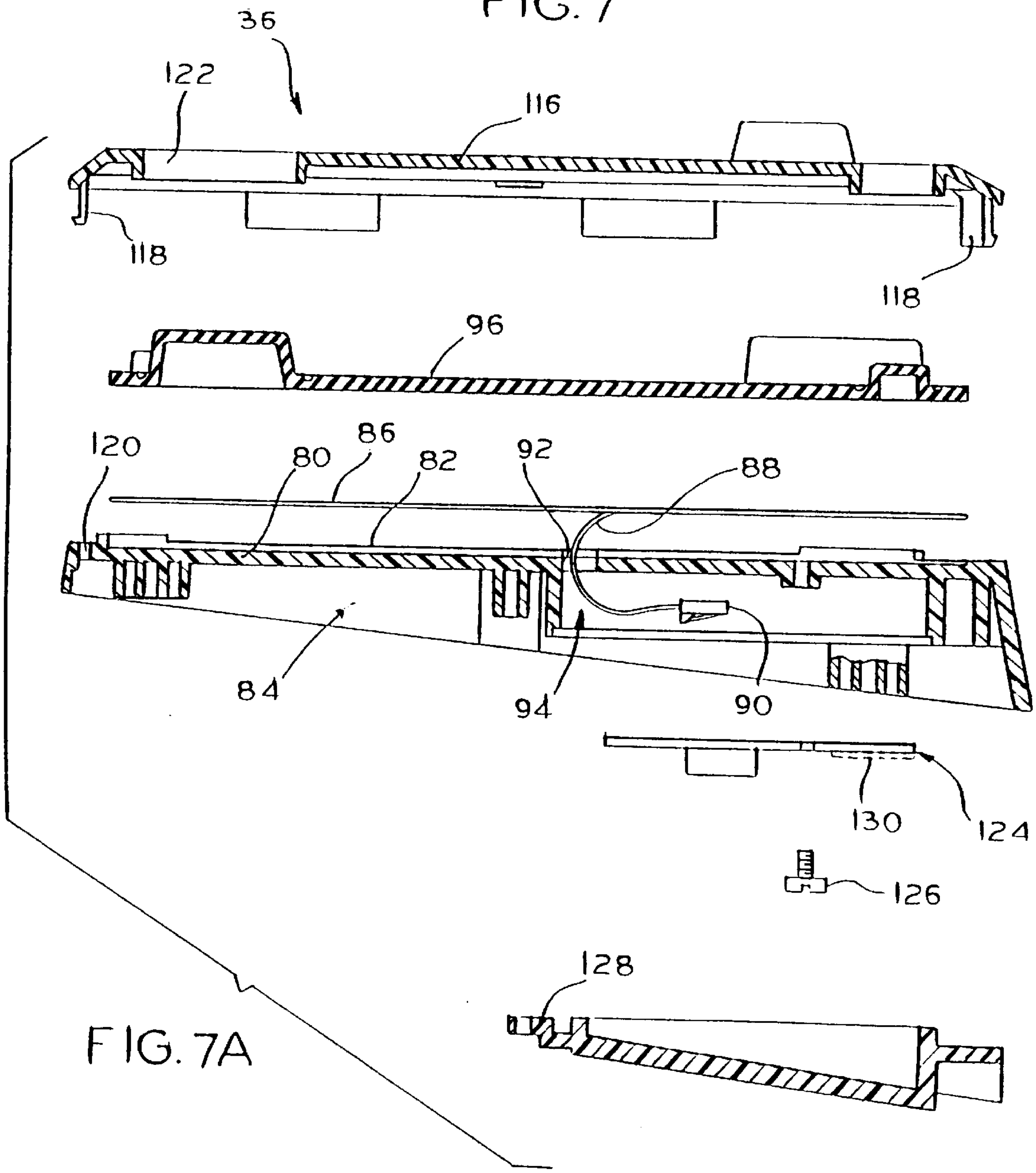
FIG. 7A is an exploded view of the foot pedal.
Figure 7B:
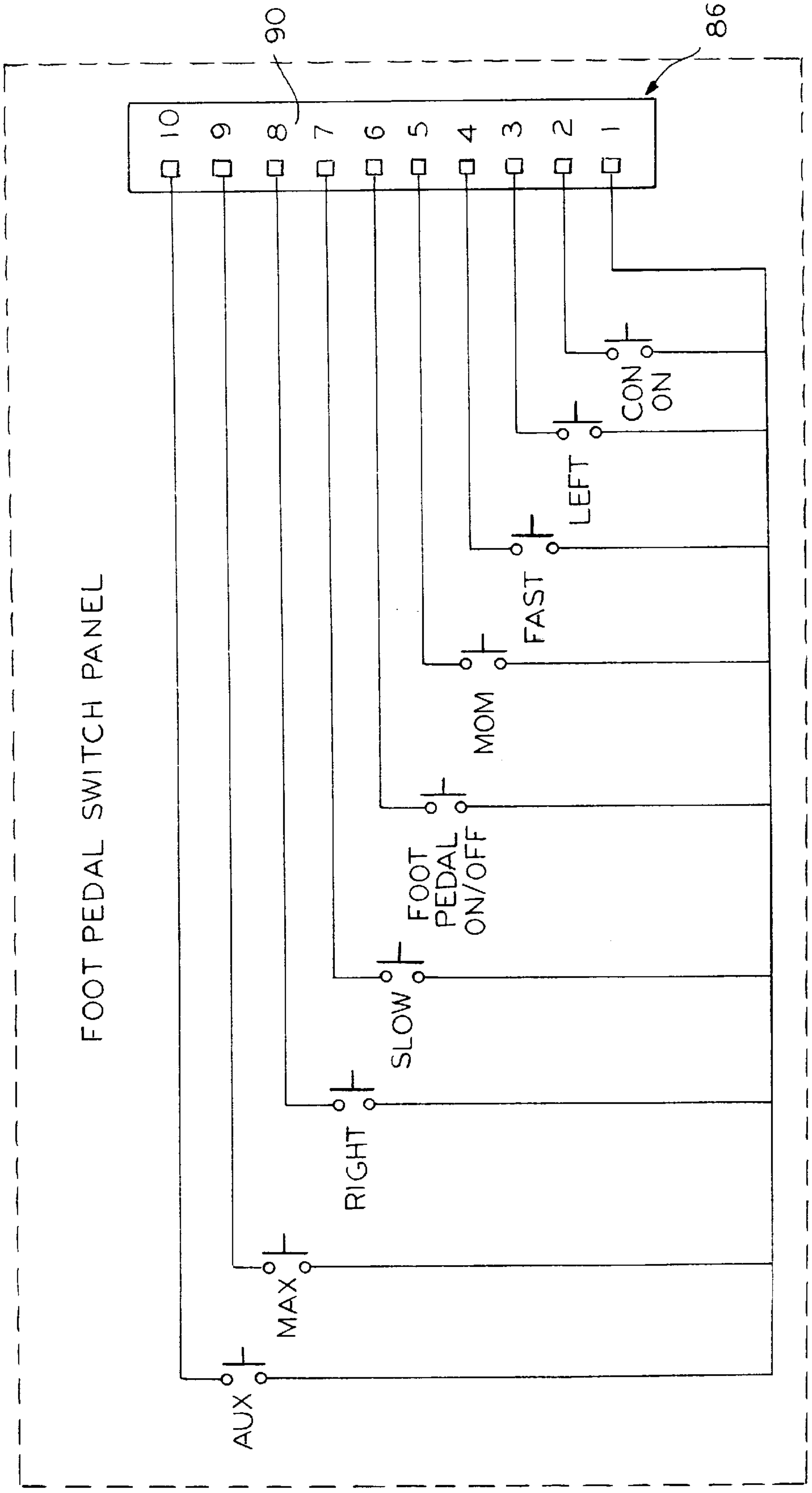
FIG. 7B is an electrical schematic for a membrane switch panel of the foot pedal.
Figure 8A:
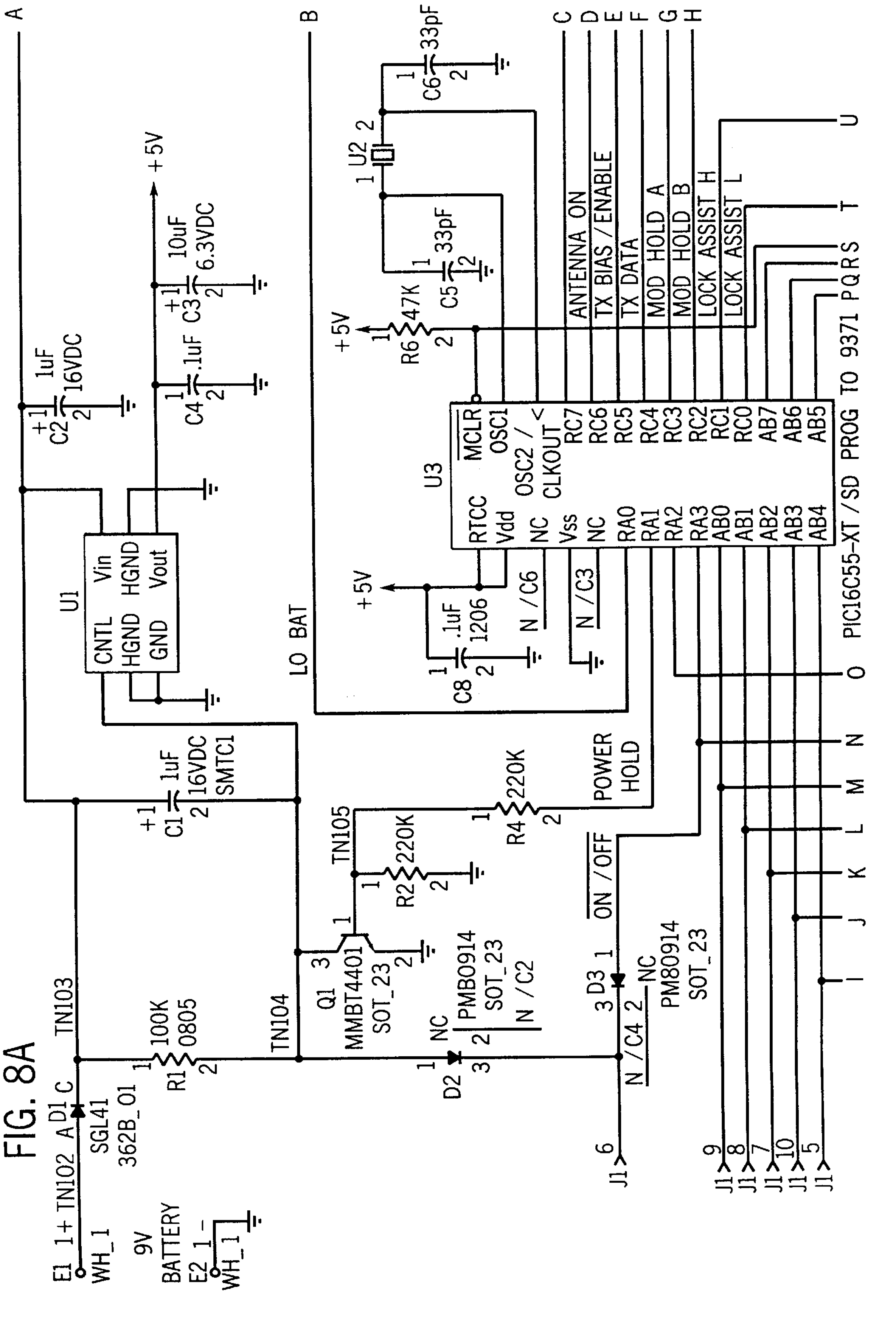
FIGS. 8A–8E is an electrical schematic for a transmitter circuit included in the foot pedal.
Figure 8B:
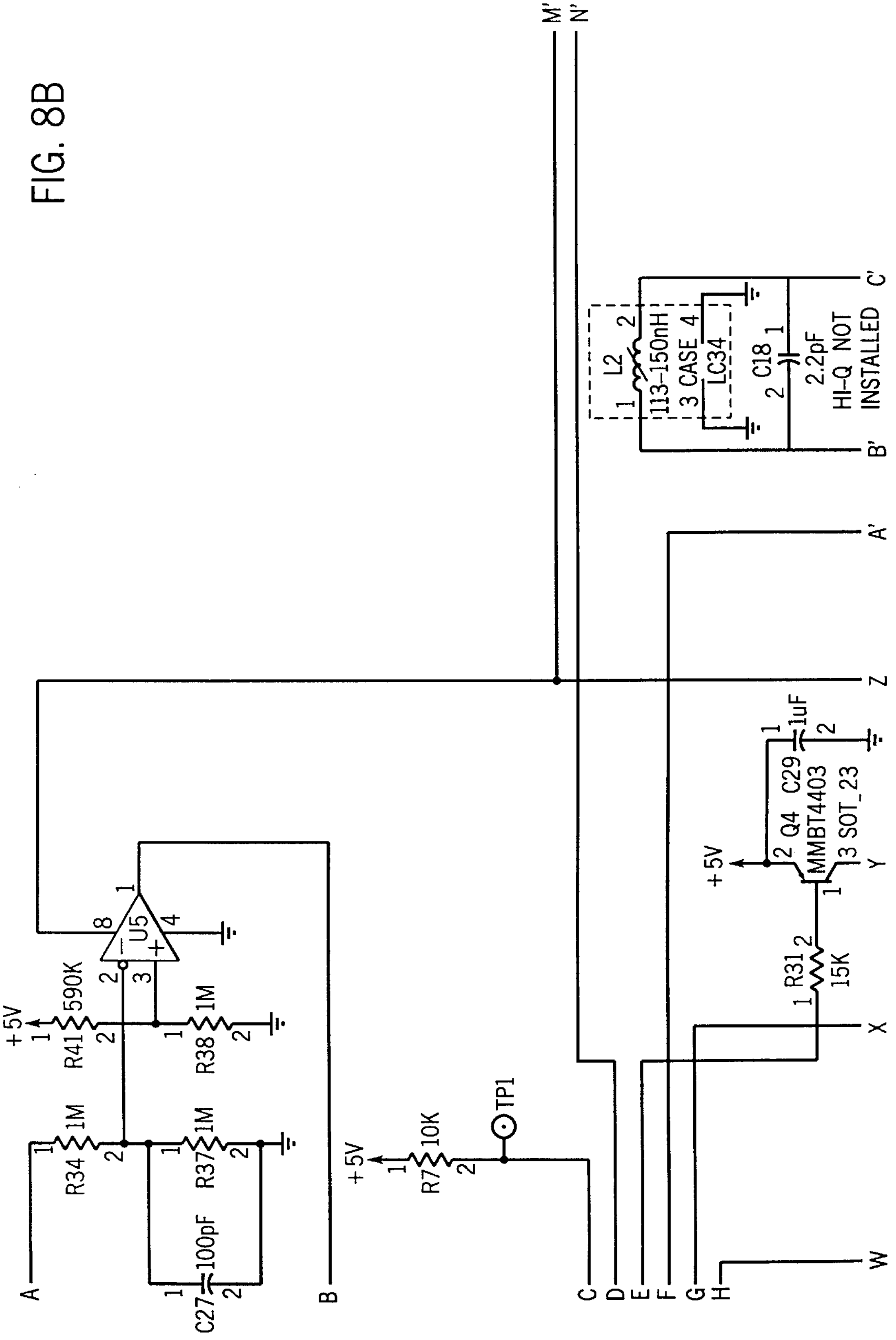
Figure 8C:
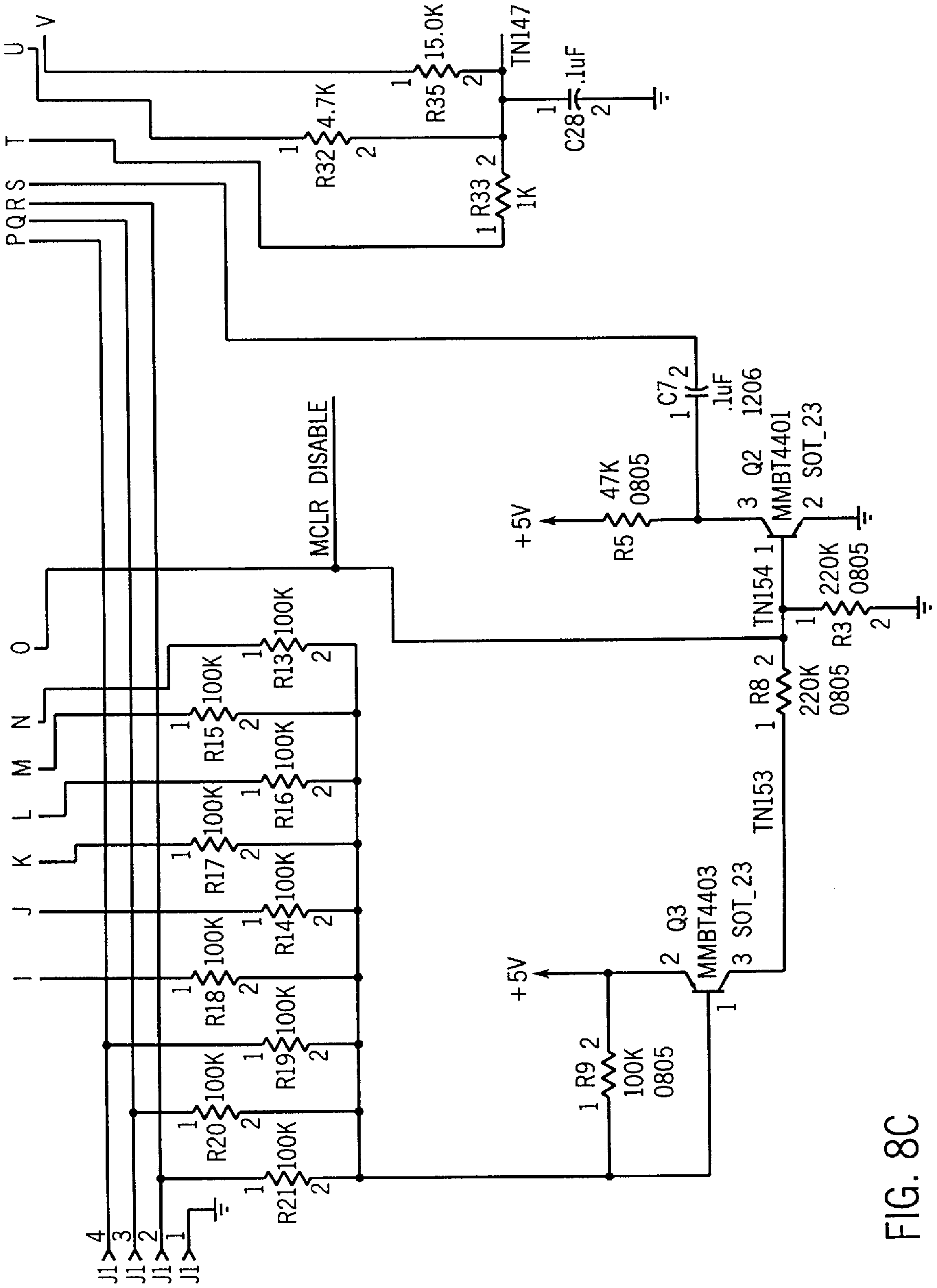
Figure 8D:
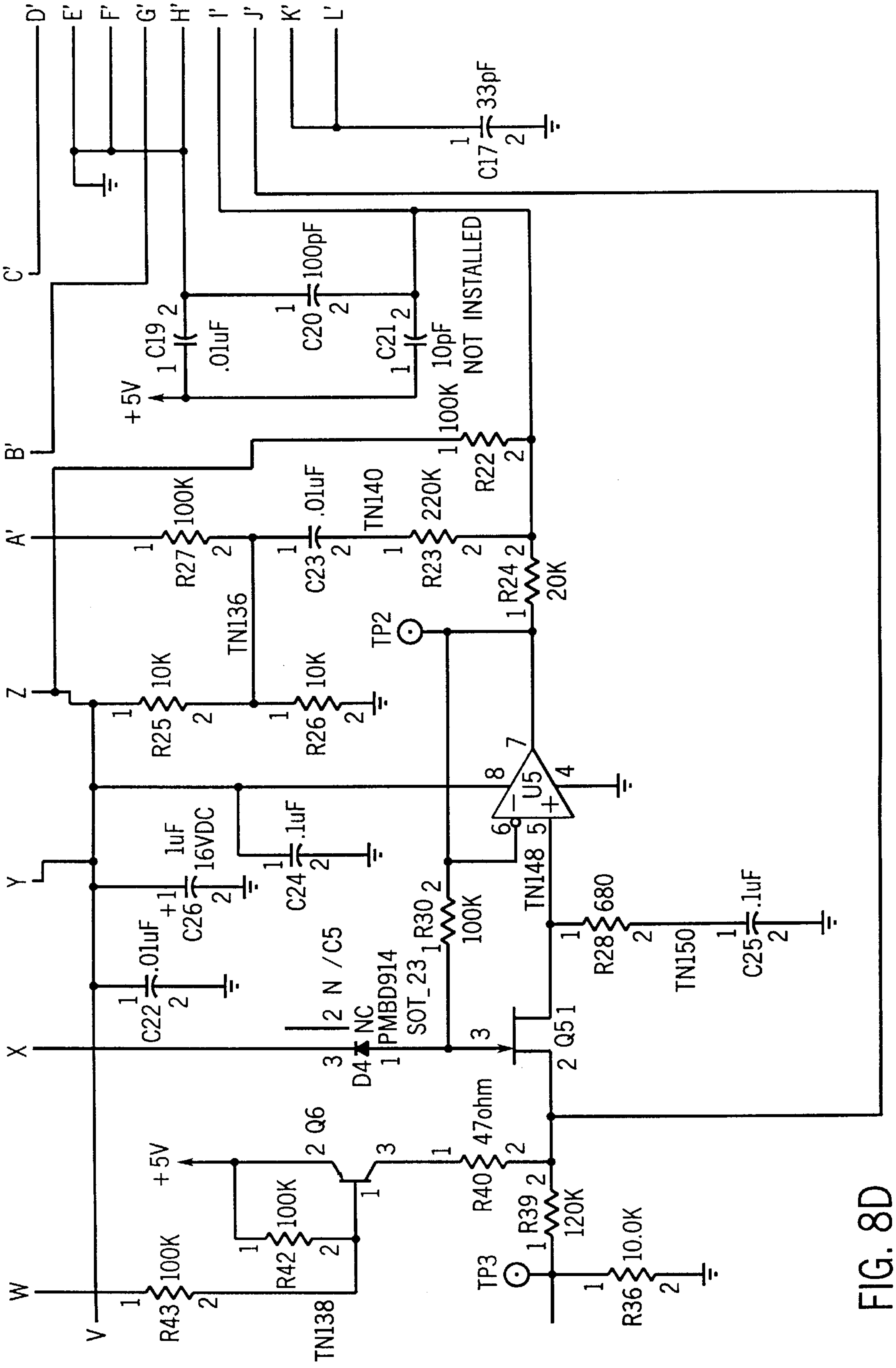
Figure 8E:
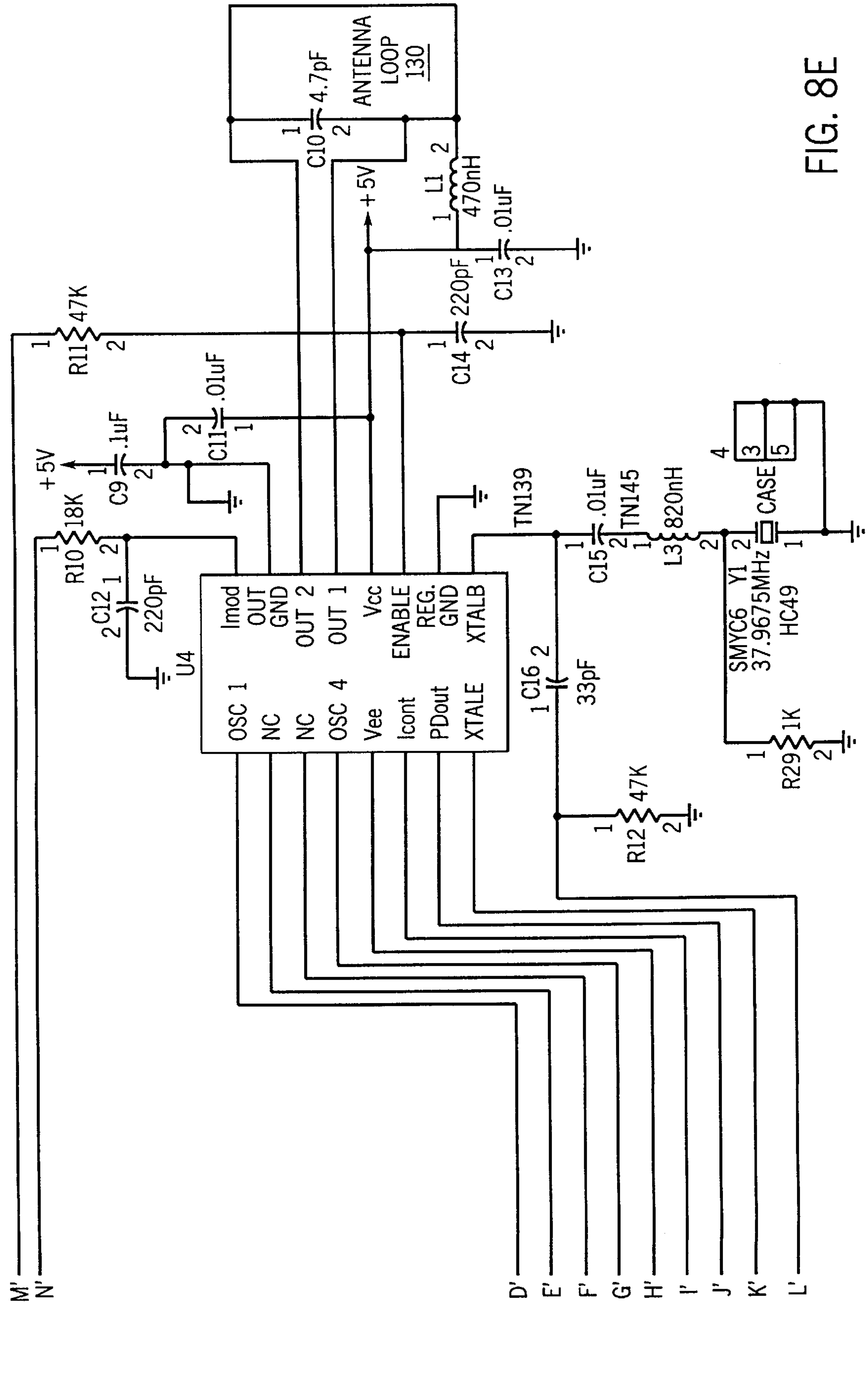
Figure 9A:
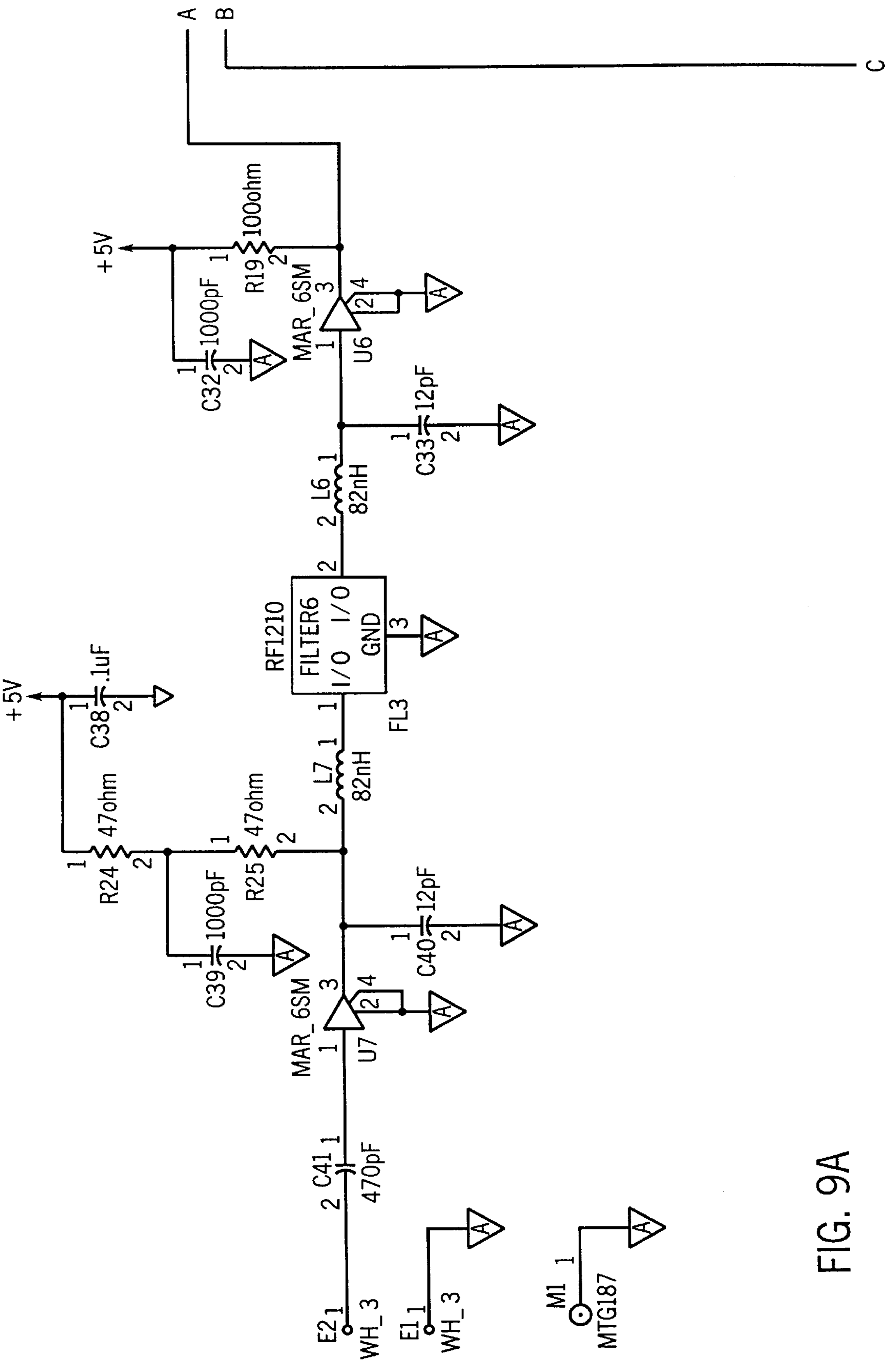
FIGS. 9A–9D is an electrical schematic of a trolling motor control circuit included in the trolling motor.
Figure 9B:
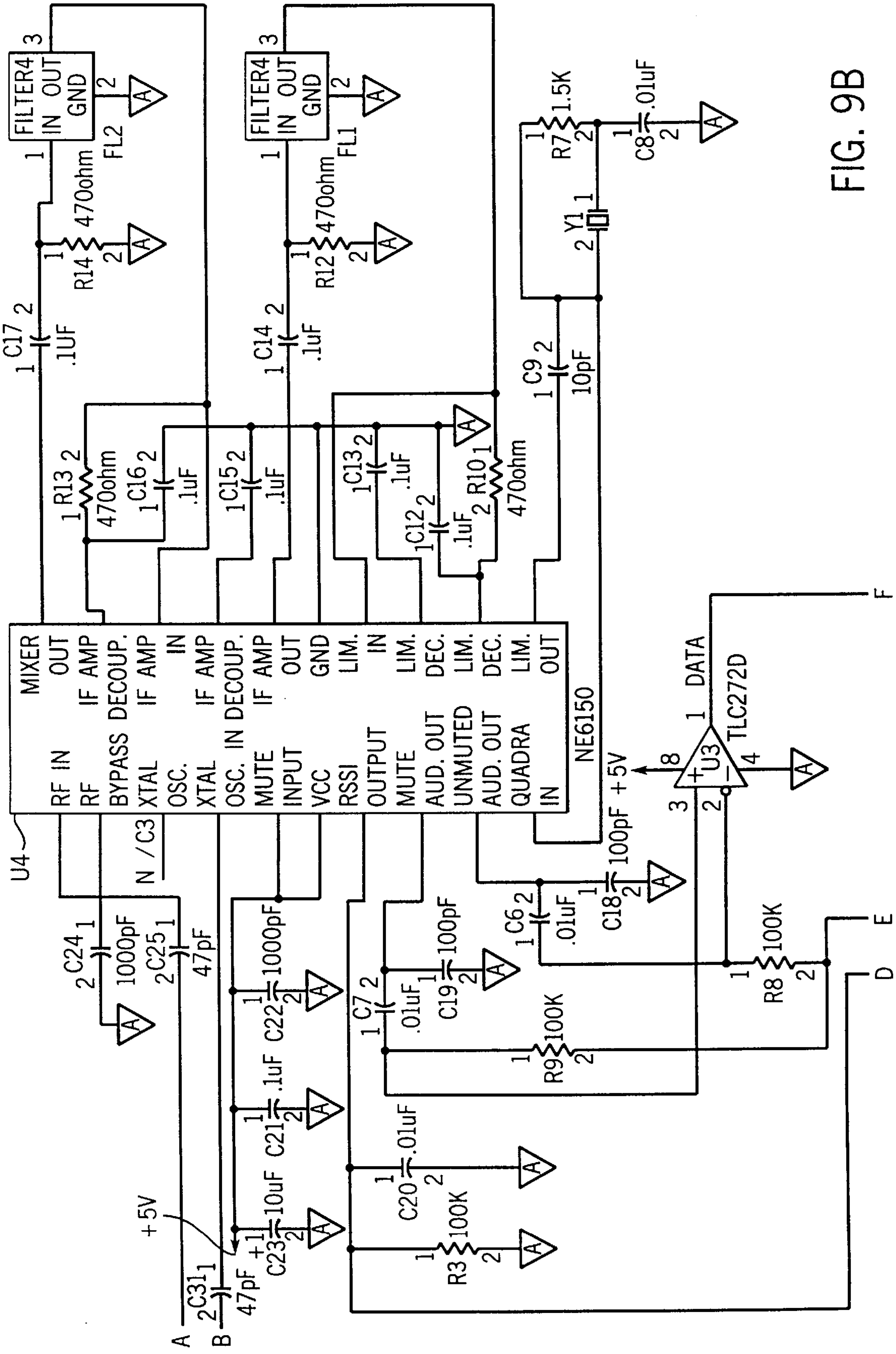
Figure 9C:
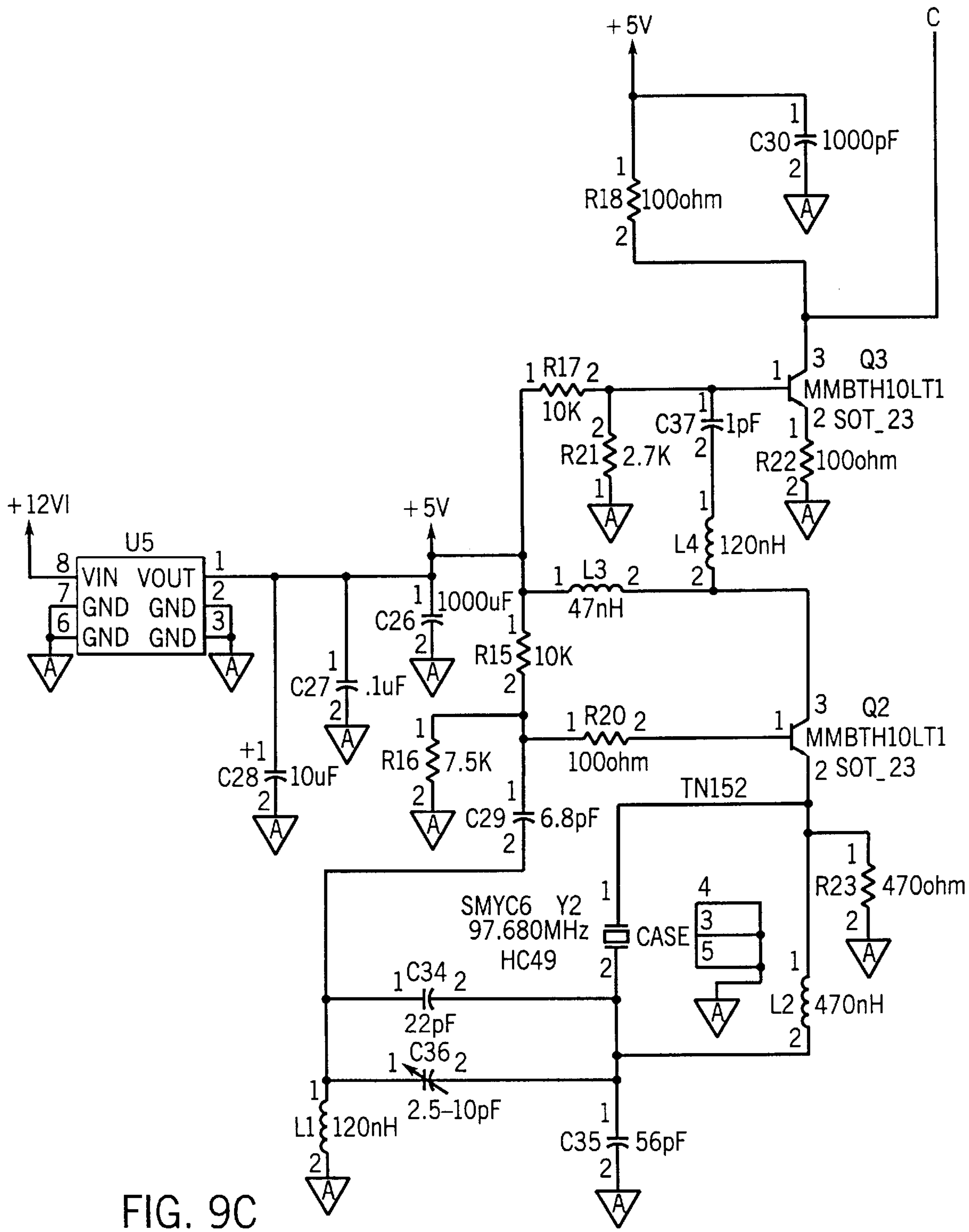
Figure 9D:
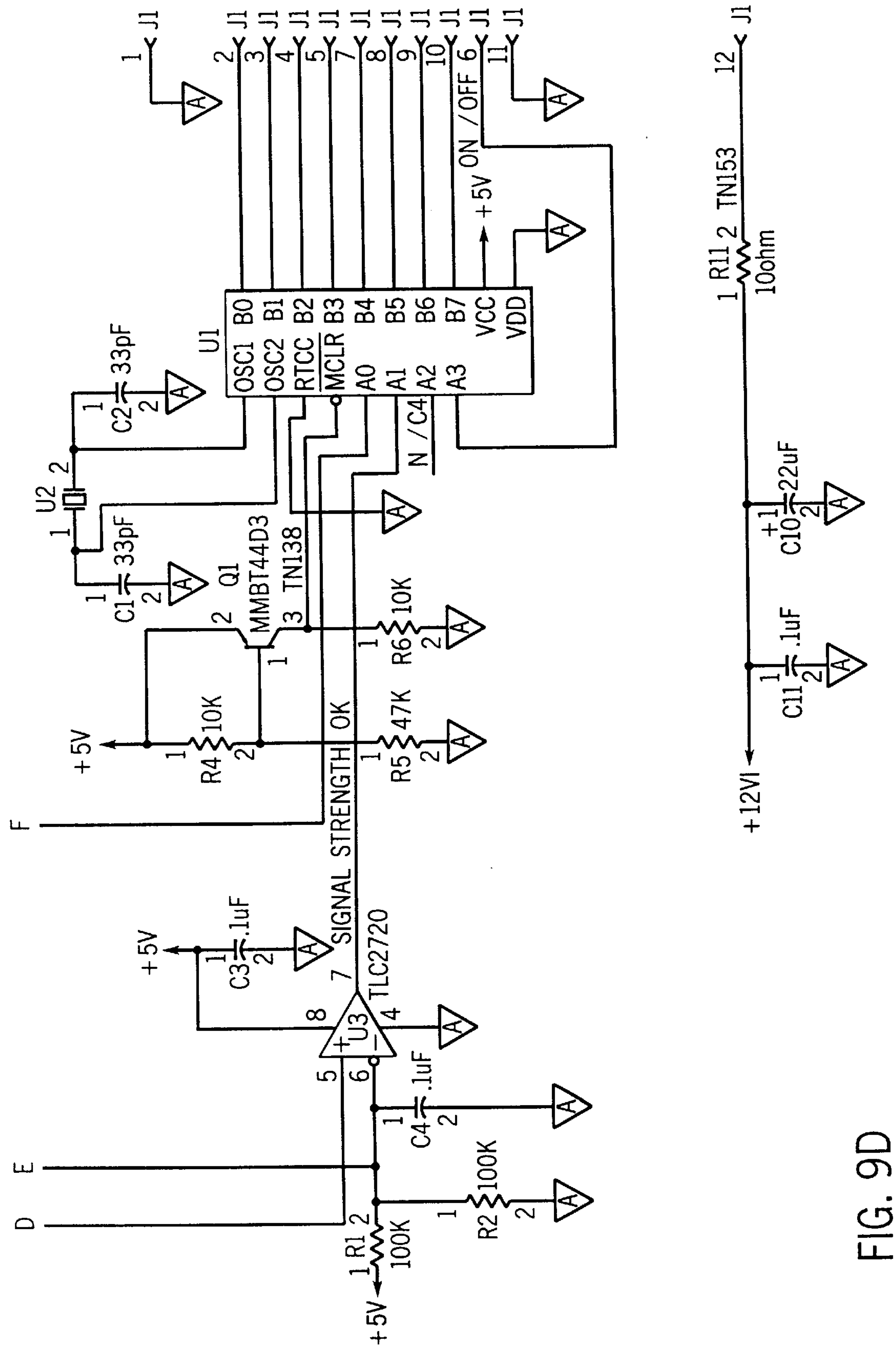
Figure 10A:
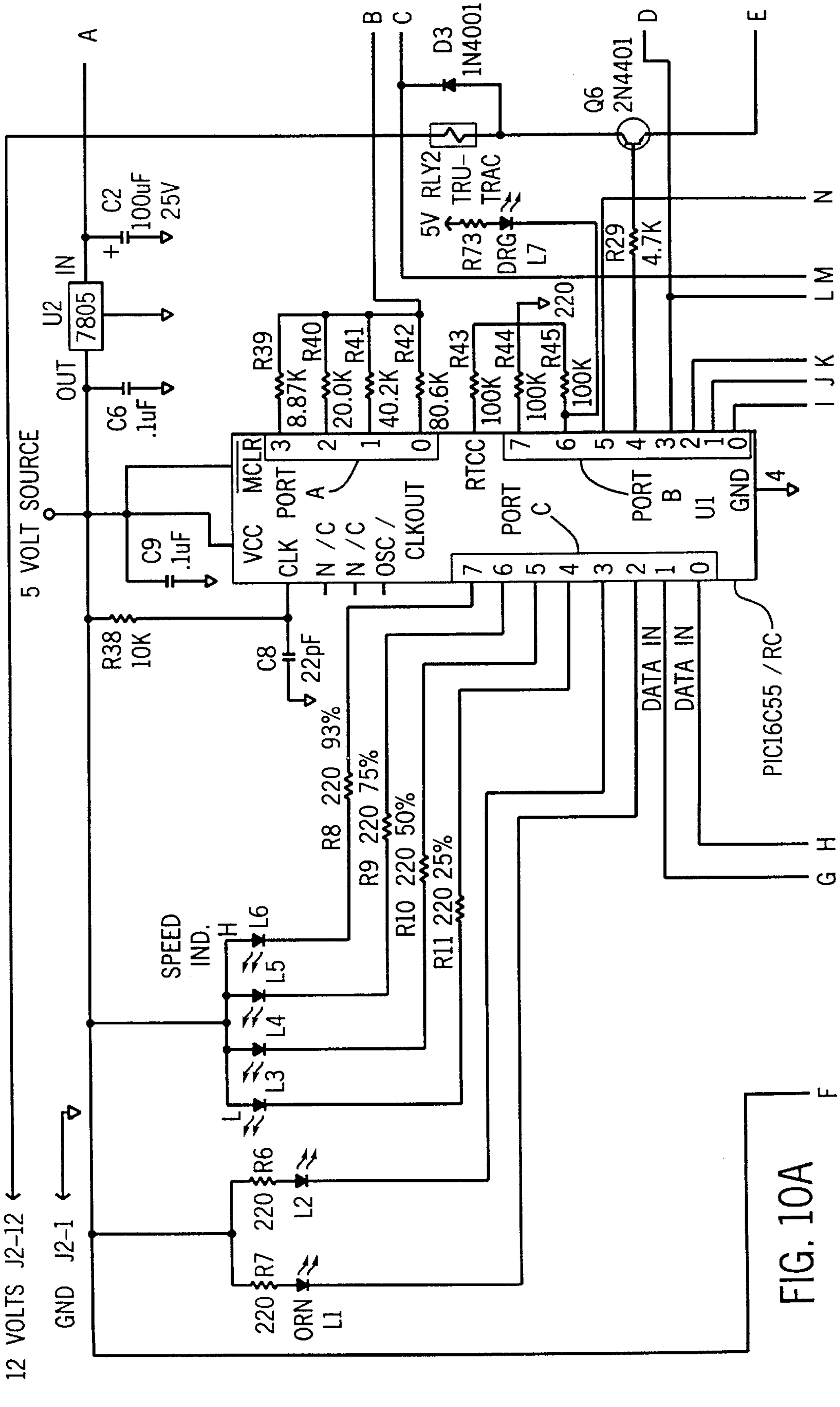
FIGS. 10A–10D is an electrical schematic of a receiver circuit for the trolling motor.
Figure 10B:
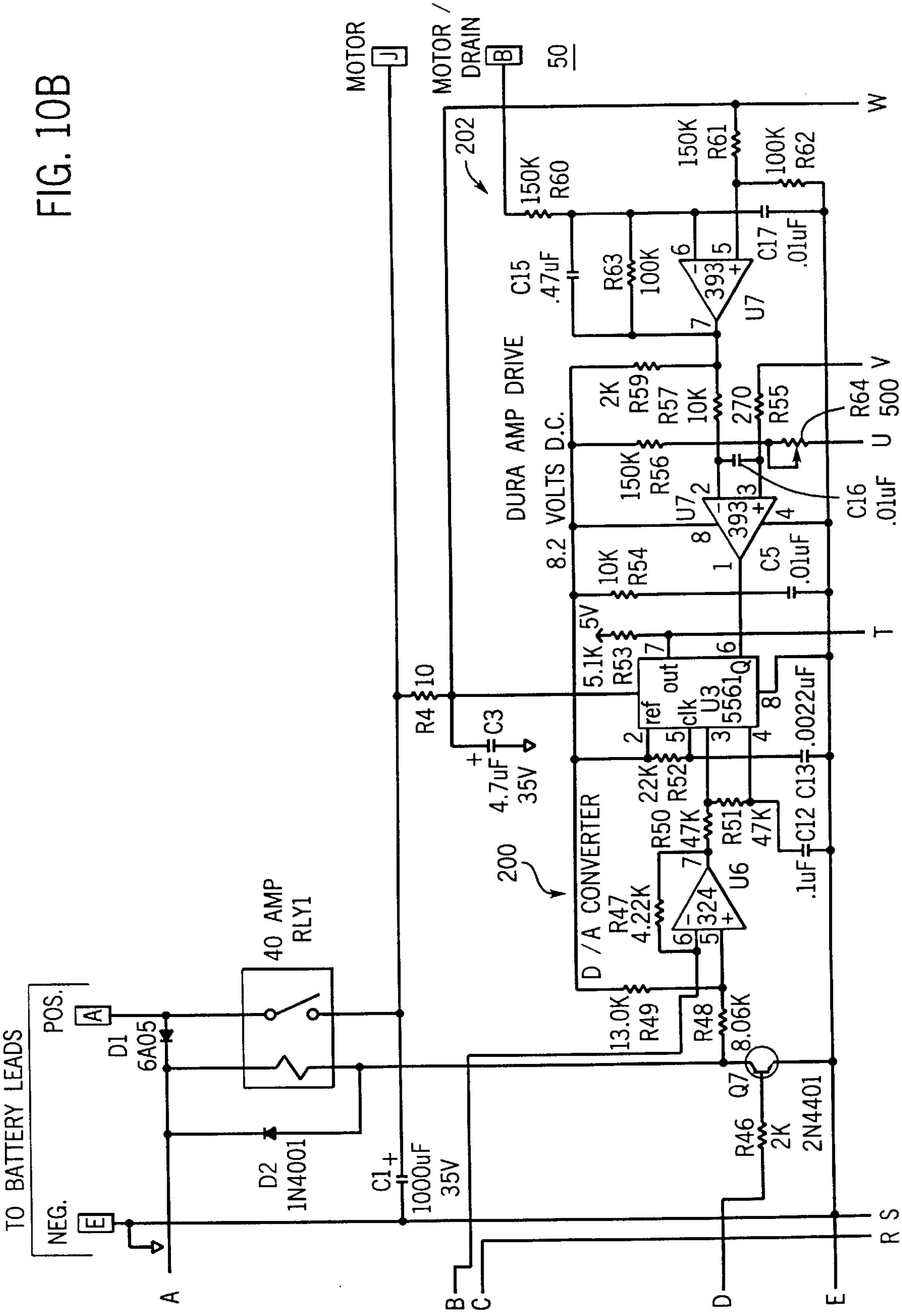
Figure 10C:
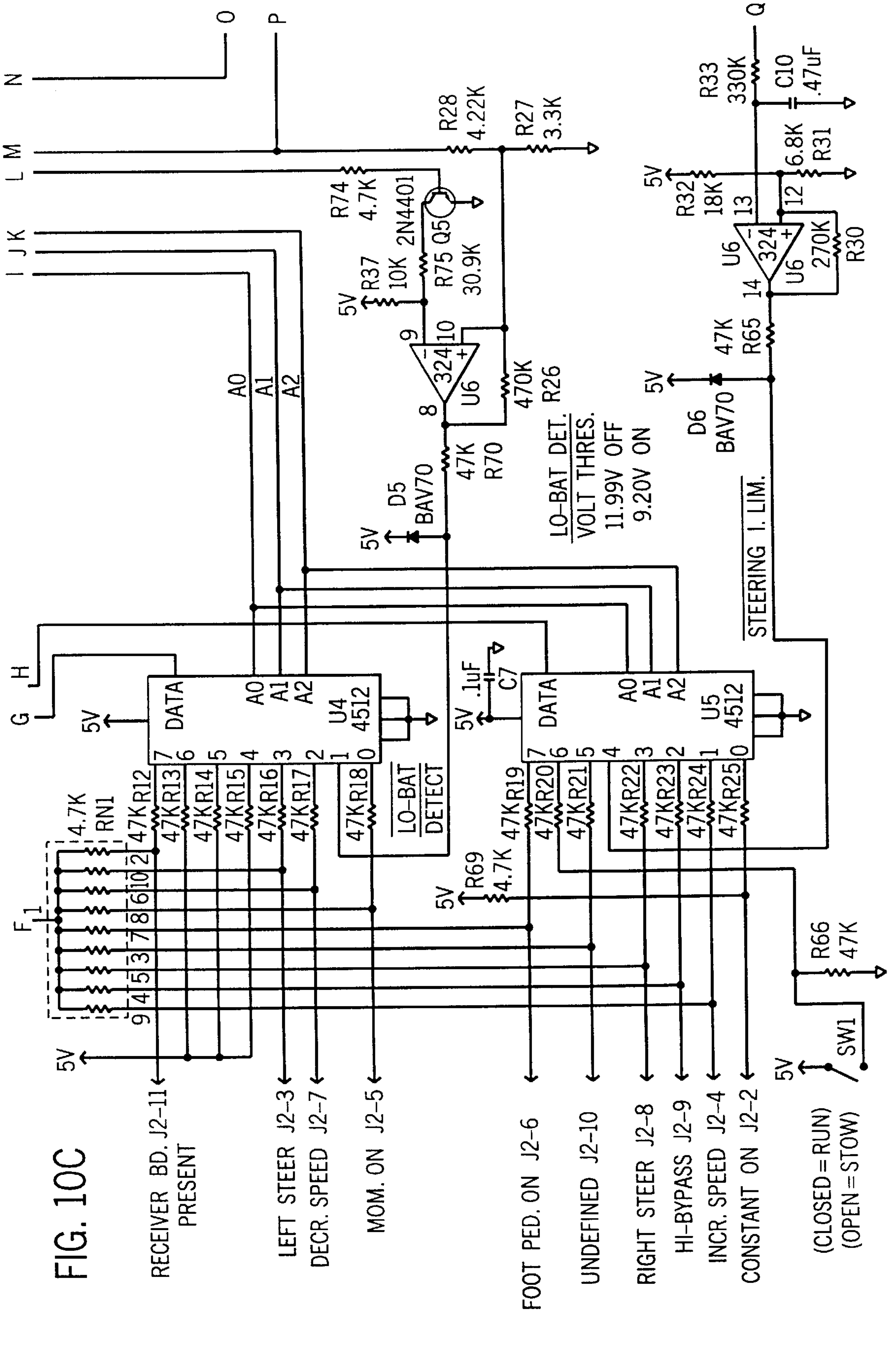
Figure 10D:
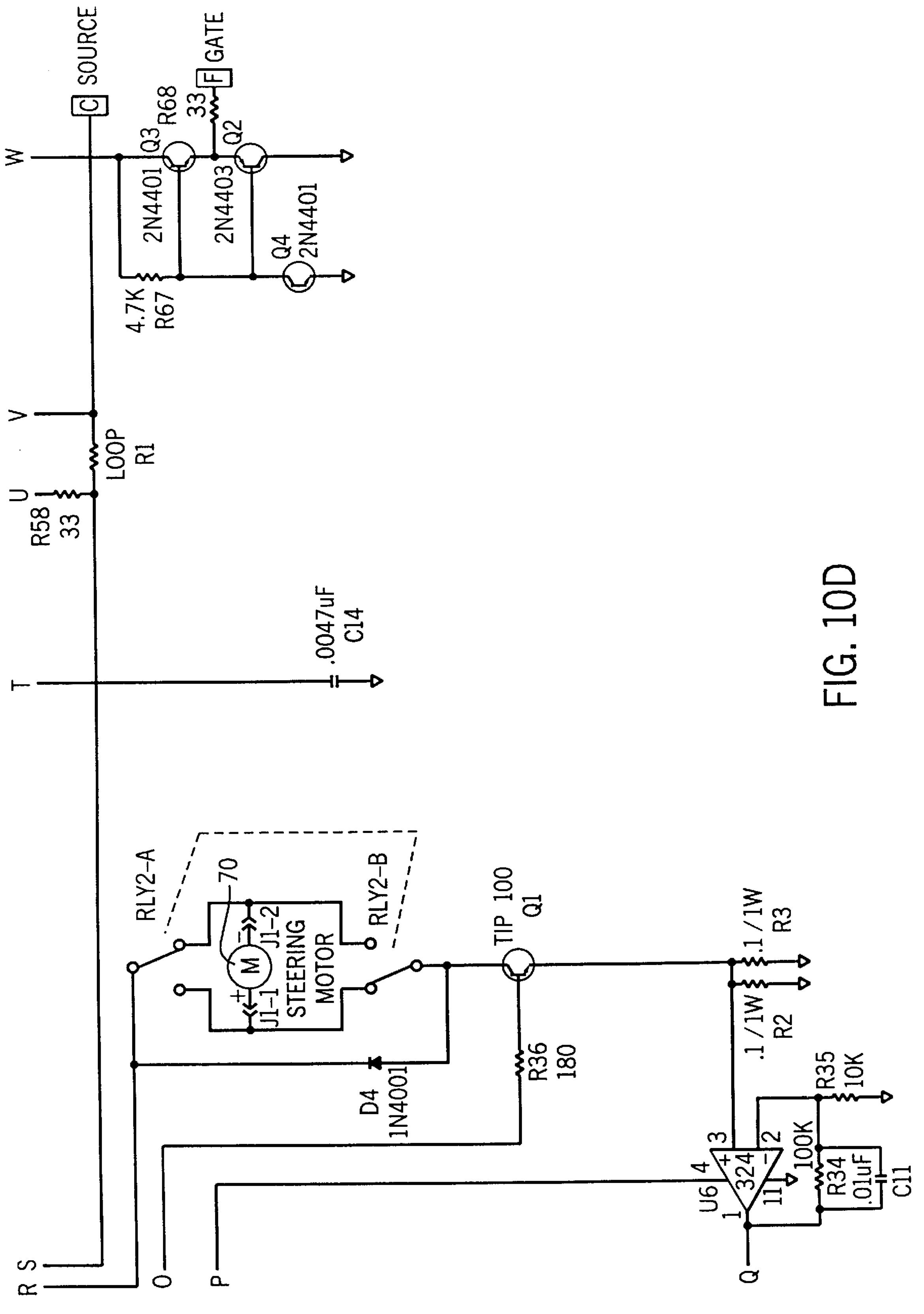

With reference to FIGS. 6, 7 and 7A, the foot pedal 36 includes a plastic base 80 having a general flat top surface 82 and open bottom 84. A membrane switch panel 86 is received on the top surface 82. The switch panel 86 includes nine membrane switches, as illustrated in FIG. 7B, connected via a cable 88 to a terminal 90 extending via an opening 92 in the base 80 into a downwardly opening circuit housing 94. An elastomer pad 96 is positioned atop the membrane switch panel. The pad 96 includes an elevated member for each of the foot pedal switches on the membrane panel 86. Particularly, as illustrated in FIG. 6, the foot pedal 36 includes an on/off switch 100. Pressing the on/off switch 100 turns the foot pedal 36 and trolling motor 34 on or off. When the foot pedal is on, the green LED on the control head 62 is illuminated and the thrust motor is rotated approximately two to three seconds. When the foot pedal 36 is off, the thrust motor 50 is rotated to the stow position and all foot pedal functions are non-functional. If the foot pedal is connected to the trolling motor directly via electrical cable, then the on/off switch 100 does not turn power off to the trolling motor but instead places the thrust motor 50 in the stowed position, which itself results in turning off the trolling motor.

A constant switch 102 when activated allows the motor 50 to run constantly without the use of the momentary switch 104, discussed below. While in the constant mode the control head orange LED stays illuminated.

A fast switch 106 increases thrust motor speed up to a preset maximum speed. A maximum switch 108 causes the thrust motor 50 to operate at its maximum speed or return to a previously selected speed. All the red LED's on the control head 62 are illuminated in the maximum mode. Speed cannot be increased or decreased in the maximum mode.

A slow switch 110 decreases the thrust motor speed. The speed can be slowed down to a complete stop. A left switch 112 turns the thrust motor 50 left. A right switch 114 turns the thrust motor 50 right. The momentary switch 104 acts as an on/off switch for the thrust motor 50. When this switch is pressed and held, it activates the thrust motor at whatever speed is selected. When released, it deactivates the thrust motor.

A plastic cover 116 is secured to the base 80 using locking tabs 118 received in openings 120 in the base 80. The membrane switch panel 86 and pad 96 are sandwiched between the base 80 and cover 116. The cover 116 includes plural through openings 122, one for each of the switch pads discussed above.

A transmitter circuit board 124 is received in the circuit housing 94 and is secured therein using a screw 126. The circuit housing is closed using a cover 128. The circuit board 124 includes a transmitter circuit, described below, having an antenna loop, represented by dashed lines 130 for transmitting a signal to the trolling motor 34 based on any of the foot pedal switches being depressed, as discussed more particularly below.

FIG. 8 illustrates an electrical schematic for the transmitter circuit on the circuit board 124 of FIG. 7A. The membrane switch panel terminal 90 is connected to the receiver circuit via a male header represented by J1. Power is provided by a nine volt battery, as indicated. The transmitter circuit operates as described below under control of a microcontroller U3, such as a PIC 16C55 microcontroller, for transmitting user commands via the antenna loop 130.

Referring to FIG. 9, an electrical schematic illustrates a receiver circuit included on a control circuit board 140, see FIG. 5A, in the control head 62. The receiver circuit receives the user commands from the transmitter circuit of FIG. 8, and supplies the commands to a header, labeled J1. The control circuit board 140 also includes a control circuit, an electrical schematic of which is shown in FIG. 10. The control circuit includes an electrical header labeled J2 connected via a ribbon cable (not shown) to the header J1 of FIG. 9. Based on commands received from the foot pedal 36 via the receiver circuit of FIG. 9, the control circuit controls operation of the steering motor 70 and the thrust motor 50 connected thereto via an electrical cable 142, see FIG. 5A.

In the illustrated embodiment of the invention, the foot pedal 36 is connected to the trolling motor 34 using radio frequency. Alternatively, the foot pedal 36 could be hard wired directly to the trolling motor 34. In such applications the transmitter circuit of FIG. 8 is omitted from the foot pedal and the receiver circuit of FIG. 9 is omitted from the control head control circuit board 140. Instead, an electrical cable directly connects the switch panel, illustrated schematically in FIG. 7B, to the J2 header of FIG. 10. As is apparent, the terminal 90 of FIG. 7B includes only ten terminal points. The control circuit header J2 includes eleven terminal points. The eleventh terminal, J2-11, when connected to the receiver circuit terminal J1-11 is grounded to indicate that a receiver board is present so that the microcontroller U1 of the control circuit knows whether it is under control of a foot pedal by radio frequency or by electrical cable.

Referring again to FIG. 8, the transmitter circuit is controlled by the microcontroller U3. The microcontroller U3 is connected via a ten-pin male header J1 to the membrane switch terminal 90. The microcontroller U3 senses if any of the membrane switches are closed and develops a data signal and other appropriate control signals for controlling an RF controller circuit U4, such as an MC131750 integrated circuit. The circuit U4 develops an RF output signal connected to the antenna loop 130. The overall circuitry of the transmitter circuit and the program in the microcontroller U3 are conventional in nature for developing an appropriate RF signal for transmitting switch commands from the foot pedal 36. The microcontroller U3 also includes programming to implement the particular features described herein, as will be readily apparent.

The schematic of FIG. 9 illustrates the receiver circuit of the control circuit board 140, see FIG. 5A. The receiver circuit includes an RF receiver circuit U4, such as a type NE615D integrated circuit, for receiving the RF signal and developing appropriate digital signals transferred to a PIC 16C54 microcontroller U1. The receiver microcontroller U1 in turn develops individual output signals to a header J1. The signals at the header J1 correspond directly to the signals at the foot pedal terminal 90. Again, the receiver circuit is conventional in nature and the particular design is intended to be compatible with that of the transmitter circuit of FIG. 8. The receiver microcontroller U1 also includes programming to implement the particular features described herein, as will be readily apparent.

Referring to FIG. 10, the control circuit is illustrated schematically. The control circuit is operated by a microcontroller U1, such as a type of PIC 16C55 integrated circuit. The control microcontroller U1 receives the command circuits from the header J2 via type 4512 integrated circuits U4 and U5. The microcontroller U1 develops appropriate signals for controlling the steering motor 70, as well as controlling motor speed via a D/A converter circuit 200 connected to a dura-amp drive circuit 202 connected to the motor 50.

One problem with electric steer trolling motors is that the steering motor stalls when the steering motor is prevented from rotation by external objects. This can be a frequent occurrence during fishing. The steering motor current is sensed by cross resistors R2 and R3 of FIG. 10. If the control microcontroller U1 receives a signal from a comparator U6 indicating an overcurrent condition, it turns off the steering motor 70 with transistor Q1. The control microcontroller U1 then waits a finite time, turns on the steering motor 70 and, if the stall is still present, repeats the cycle. This permits full application of stall current to the steering motor 70 for a finite time. This gives maximum torque out of the steering motor 70 and still provides protection for the motor and electronics. Since maximum torque can be obtained from the motor, a less expensive motor can be used than would be required with alternative designs.

A kill function is operable to disable the thrust motor and steering motor after stowing of the motor on the mount. This design uses a mercury switch SW1, see also FIG. 5A, to sense when the trolling motor is stowed, i.e., at an angle of greater than 45°, on the mount. When the stowing position is sensed, then the thrust motor and steering motor are disabled a finite time thereafter.

Trolling motors typically include linear potentiometers to control thrust motor speed. In accordance with the invention two membrane switches 106 and 110 on the foot pedal 36 are used to control increase and decrease of thrust motor speed, respectively. The switches provide input to the microcontroller U1 of FIG. 10 which then outputs a voltage to the pulse width modulation dura-amp drive circuit 202 and to the red LED speed indicators L3, L4, L5 and L6.

With a remote foot pedal 36 it is important to provide indication that the foot pedal 36 is in communication with the control electronics of FIG. 10. In accordance with the invention the orange LED L1 indicates any time any function is selected on the foot pedal 36. This provide visible indication that the foot pedal 36 is communicating with the trolling motor control electronics.

The system includes two low battery indicators. When the thrust motor 50 is off the open circuit battery voltage is sensed by a low battery detect circuit using a comparator U6. The trip point is sensed at 11.99 volts and will flash speed the LED's L3–L6 when the battery voltage drops below the trip point. This is an indication of the charge status of the trolling motor battery. When the thrust motor is turned on, a different trip point of 9.2 volts is selected by the microcontroller U1 through a transistor Q5. Thus, the speed LED's L3–L6 will flash indicating that there is a problem with the batteries and/or the boat wiring. If these LED's flash, then the fisherman is notified that there is not sufficient voltage to operate the trolling motor 34. This avoids problems of a customer returning a trolling motor for repair when the problem was actually with batteries or boat wiring.

With the remote foot pedal 36 a second low battery indication is provided by the green LED L2. The LED L2 remains constant on if the remote foot pedal 36 is turned on and flashes if the foot pedal battery is low. Thus, the fisherman is notified when there is about 6–20 hours of fishing left on the present battery. This is communicated via the remote control communication signal.

The disclosed invention uses radio frequency to remotely control the different trolling motor functions. However, as is apparent, all of the features could also be controlled using infrared (IR) communication.

FIGS. 11, 12, 13, 14A and 14B, 15A and 15B, 16A and 16B, and 17 illustrate a program implemented by the microcontroller U1 of the control circuit of FIG. 10 for controlling operation of the various trolling motor functions.

Figure 11:
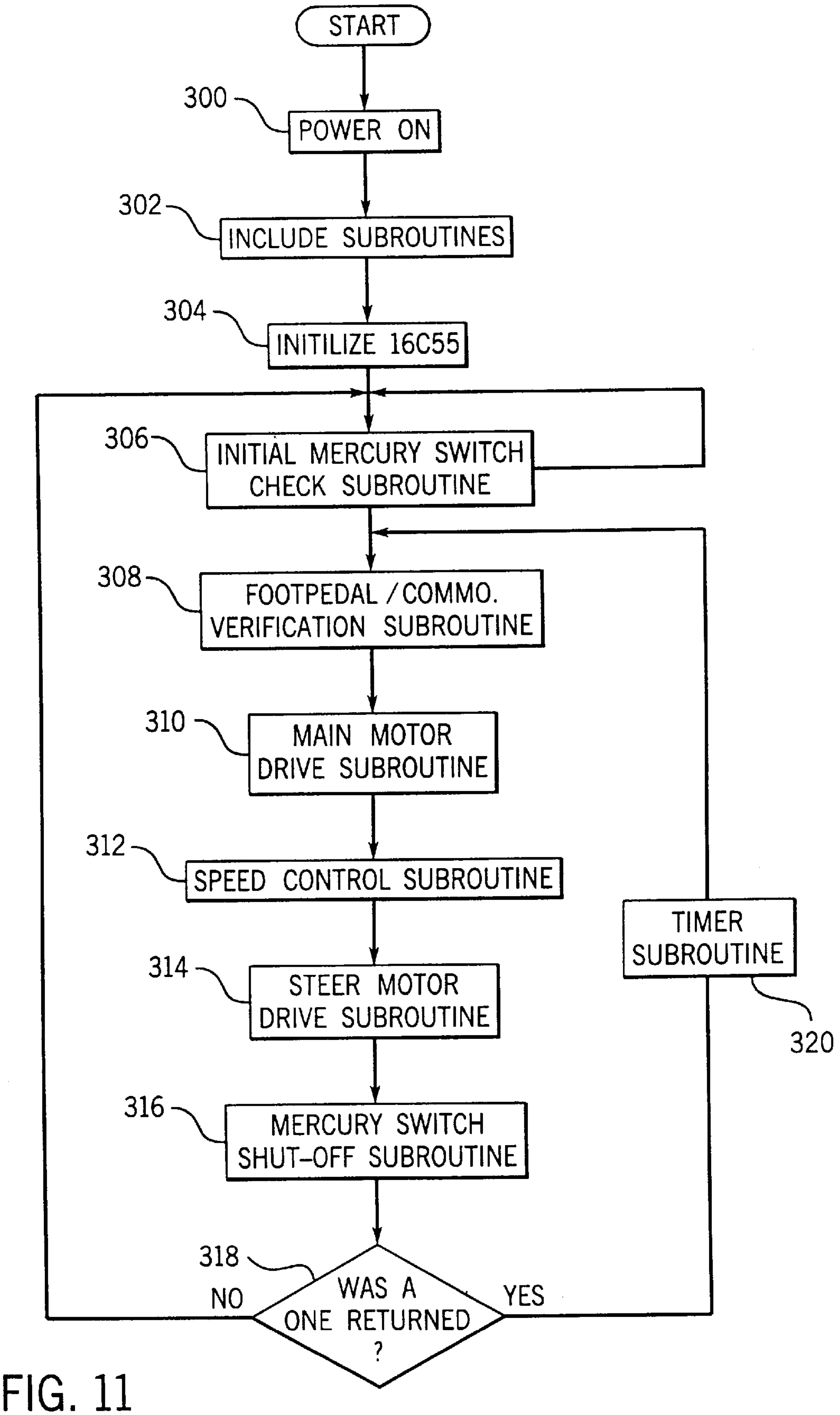
FIG. 11 is a flow diagram of a main control loop or routine implemented in the microcontroller of FIG. 10.

Referring initially to FIG. 11, a flow diagram illustrates a main routine implemented by the microcontroller U1 of FIG. 10 for controlling trolling motor operation. This routine begins with a conventional startup routine at blocks 300, 302 and 304. Thereafter, the main routine begins a loop comprising an initial mercury switch check sub-routine at a block 306. The mercury check routine stops operation of the trolling motor until the mercury switch and the foot pedal inputs are pulled low. This is followed by a foot pedal/communication verification sub-routine at a block 308, a main motor drive sub-routine at a block 310, a speed control sub-routine at a block 312, a steer motor drive sub-routine at a block 314, and a mercury switch shut-off sub-routine at a block 316. A decision block 318 determines if a "1" was returned indicating that the motor is not in a parked condition. If not, then control loops back to the block 306. If so, then a timer sub-routine is implemented at a block 320 and control returns to the block 308.

Figure 12A:
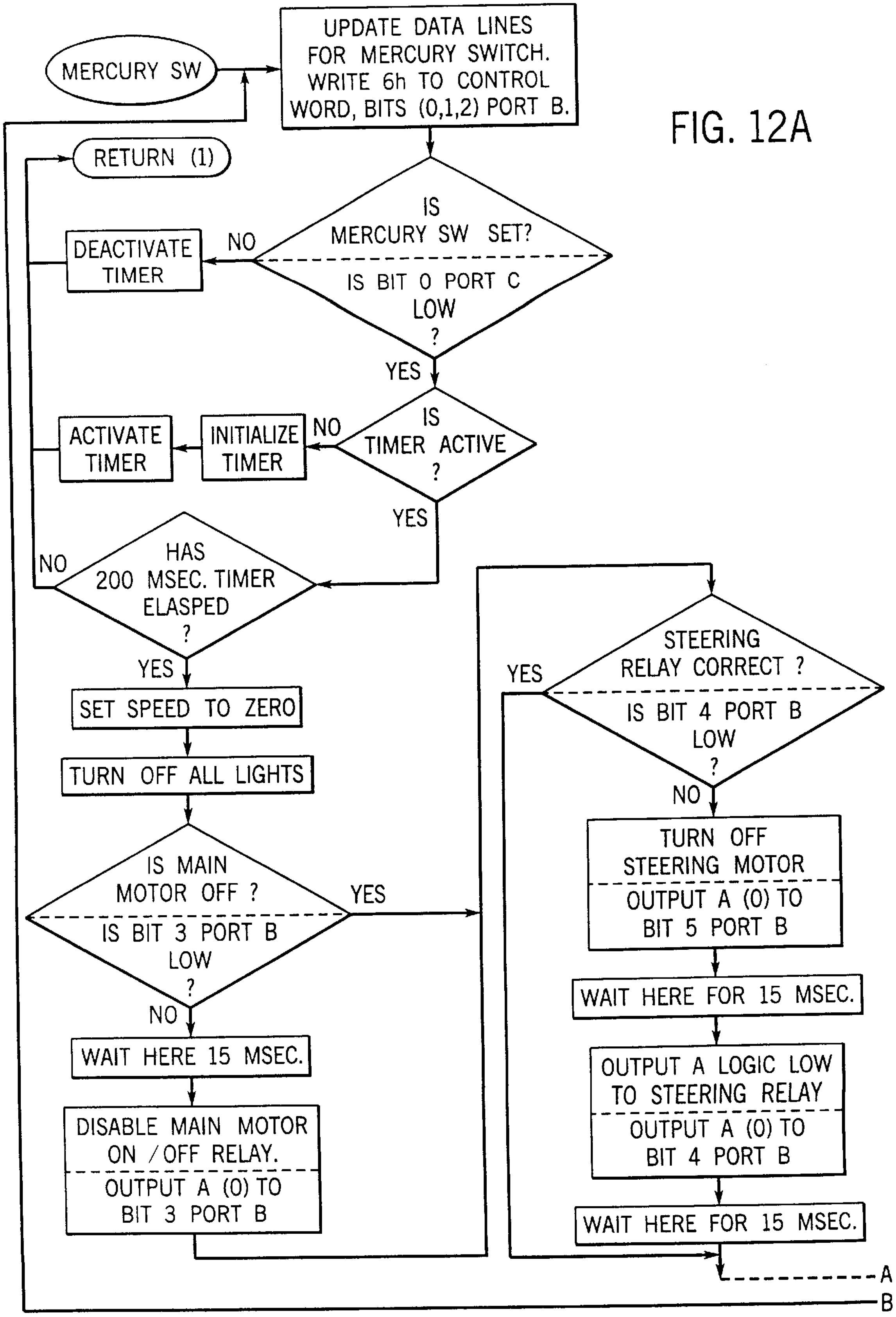
FIGS. 12A–12B is a flow diagram of a mercury switch subroutine of the main routine of FIG. 11.
Figure 12B:
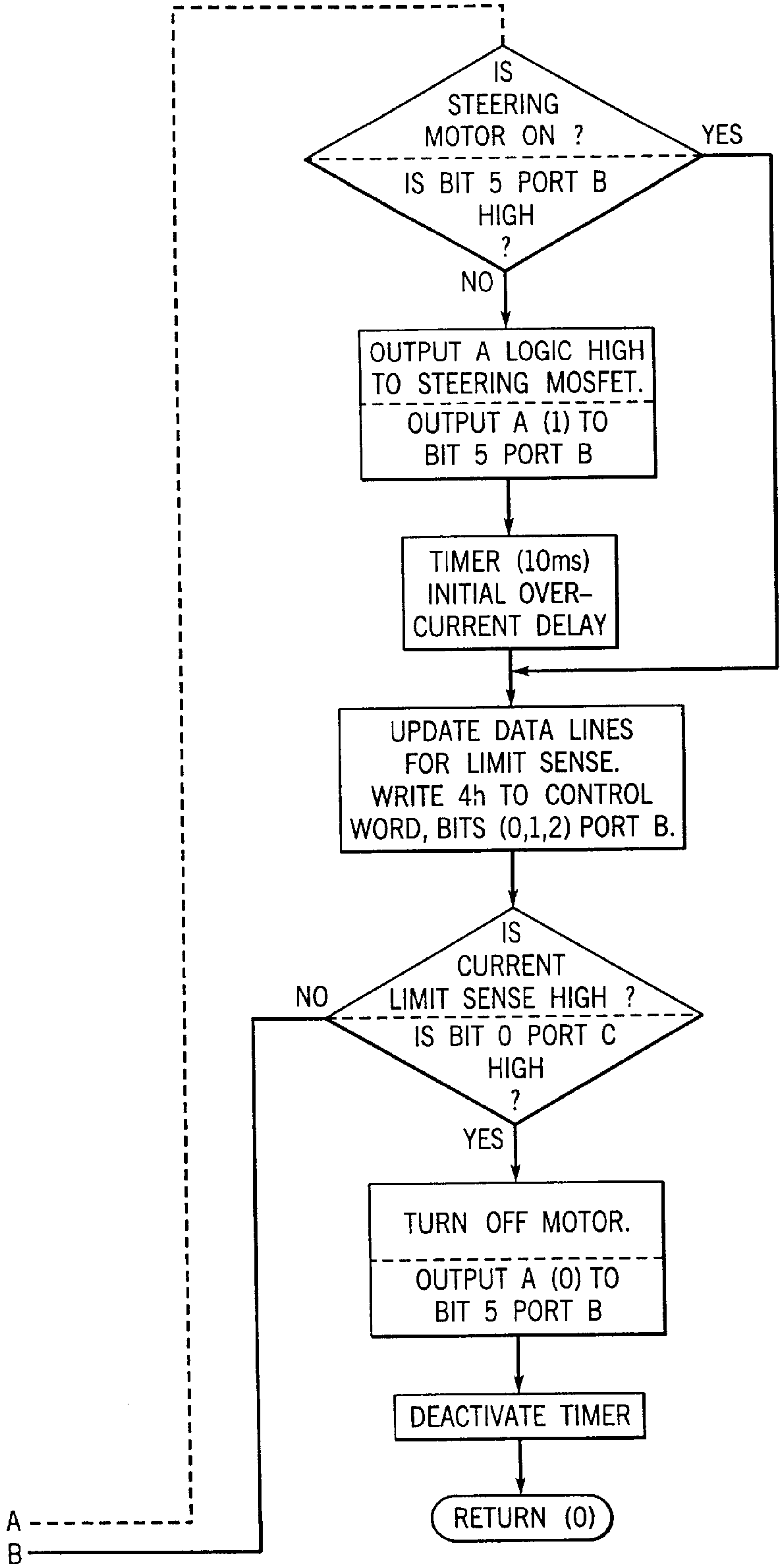

FIG. 12 illustrates the mercury switch sub-routine. This routine is operable to determine if the mercury switch has changed state and, if so, perform an appropriate park routine. The operation of the routines are described elsewhere herein.

Figure 13:
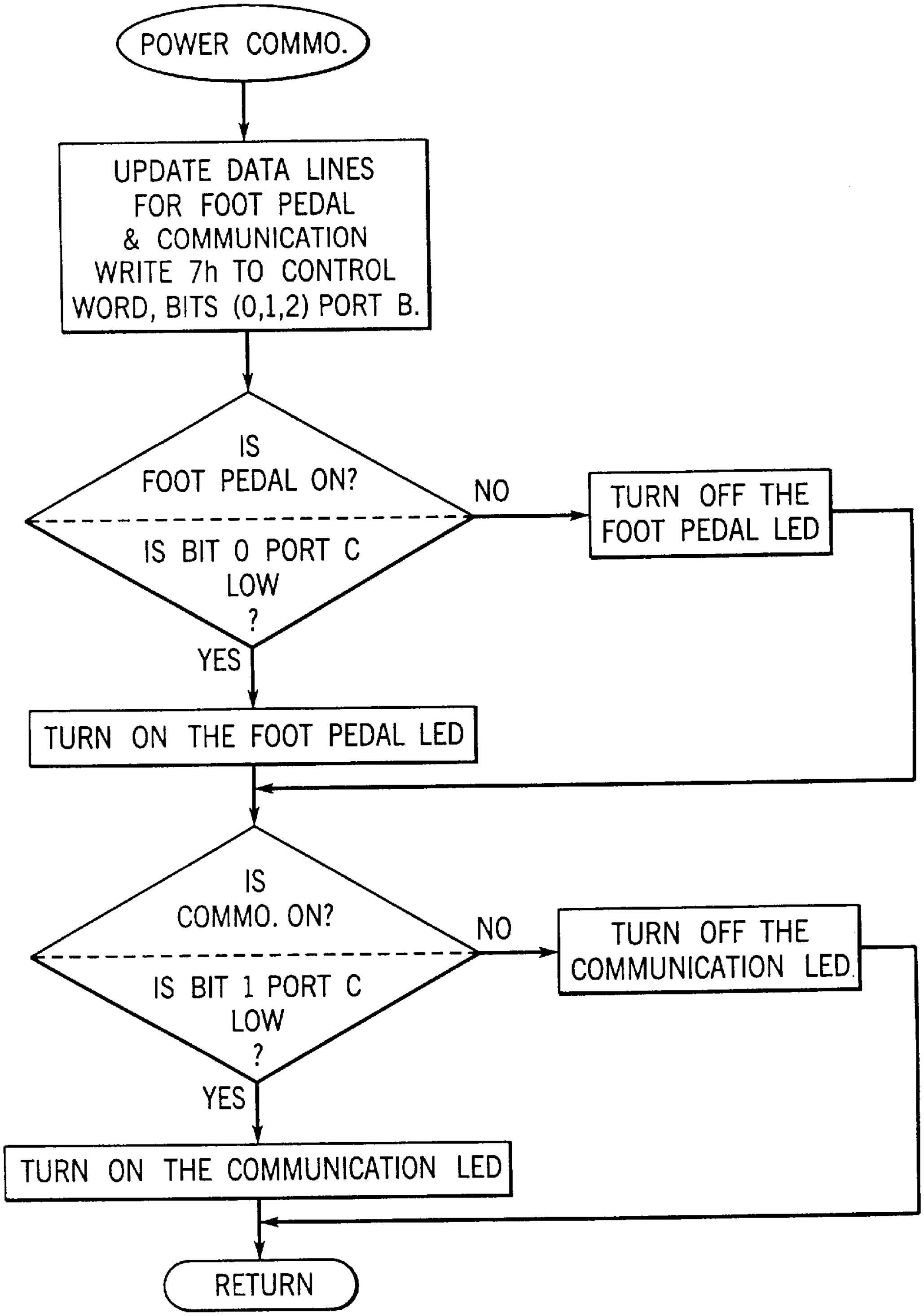
FIG. 13 is a flow diagram of a power communication subroutine of the main routine of FIG. 11.

Referring to FIG. 13, a flow diagram illustrates operation of the foot pedal/communication verification sub-routine of the block 308 of FIG. 11. This routine is used to determine if the foot pedal is on and if information is currently being communicated.

Figure 14A:
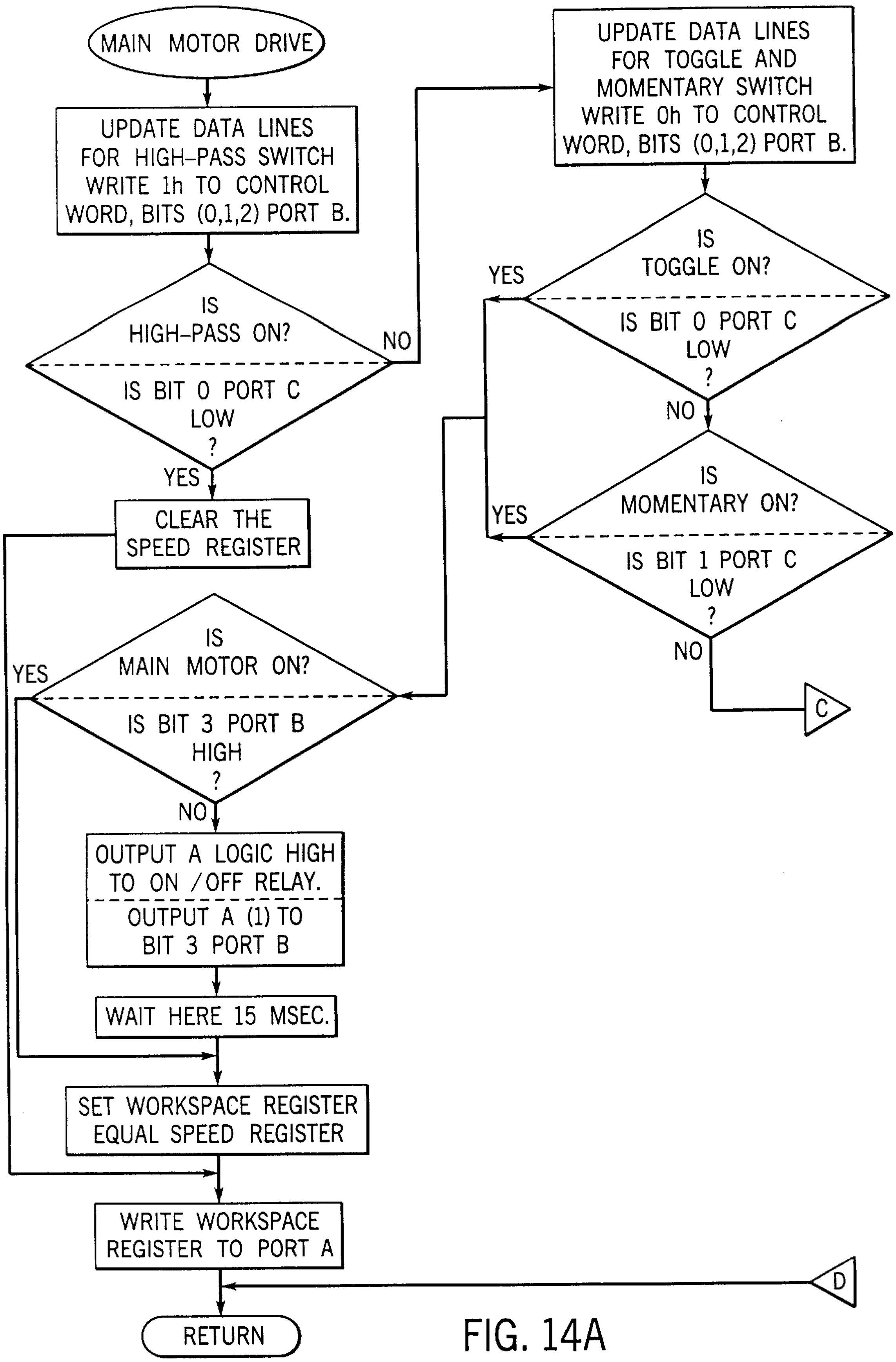
FIGS. 14A and 14B comprise a flow diagram of a main motor drive subroutine of the main routine of FIG. 11.
Figure 14B:
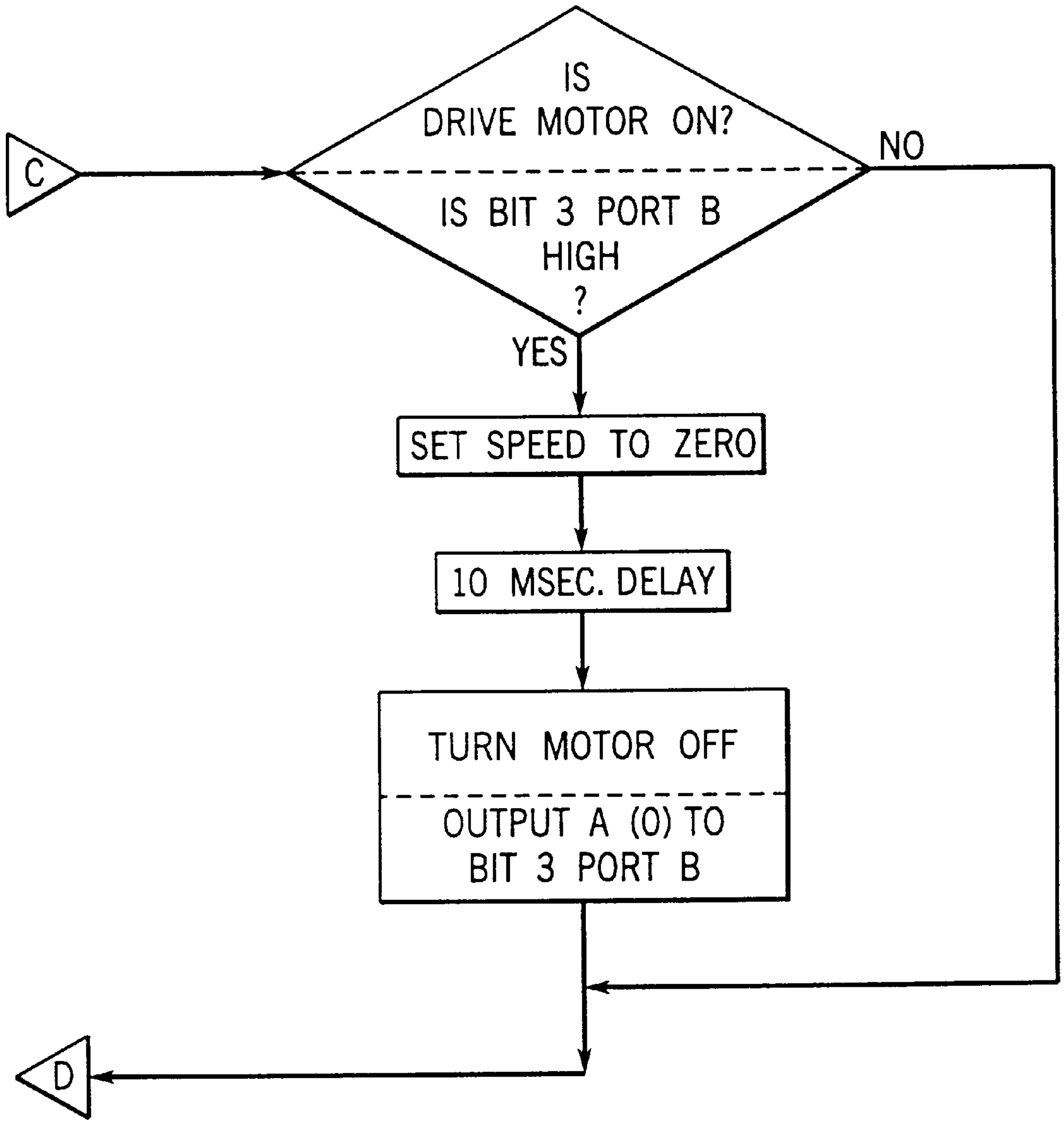

Referring to FIGS. 14A and 14B, the main motor drive sub-routine of block 310 of FIG. 11 is illustrated. This routine is operable to enable motor operation when the motor is commanded to operate and set the selected speed.

Figure 15A:
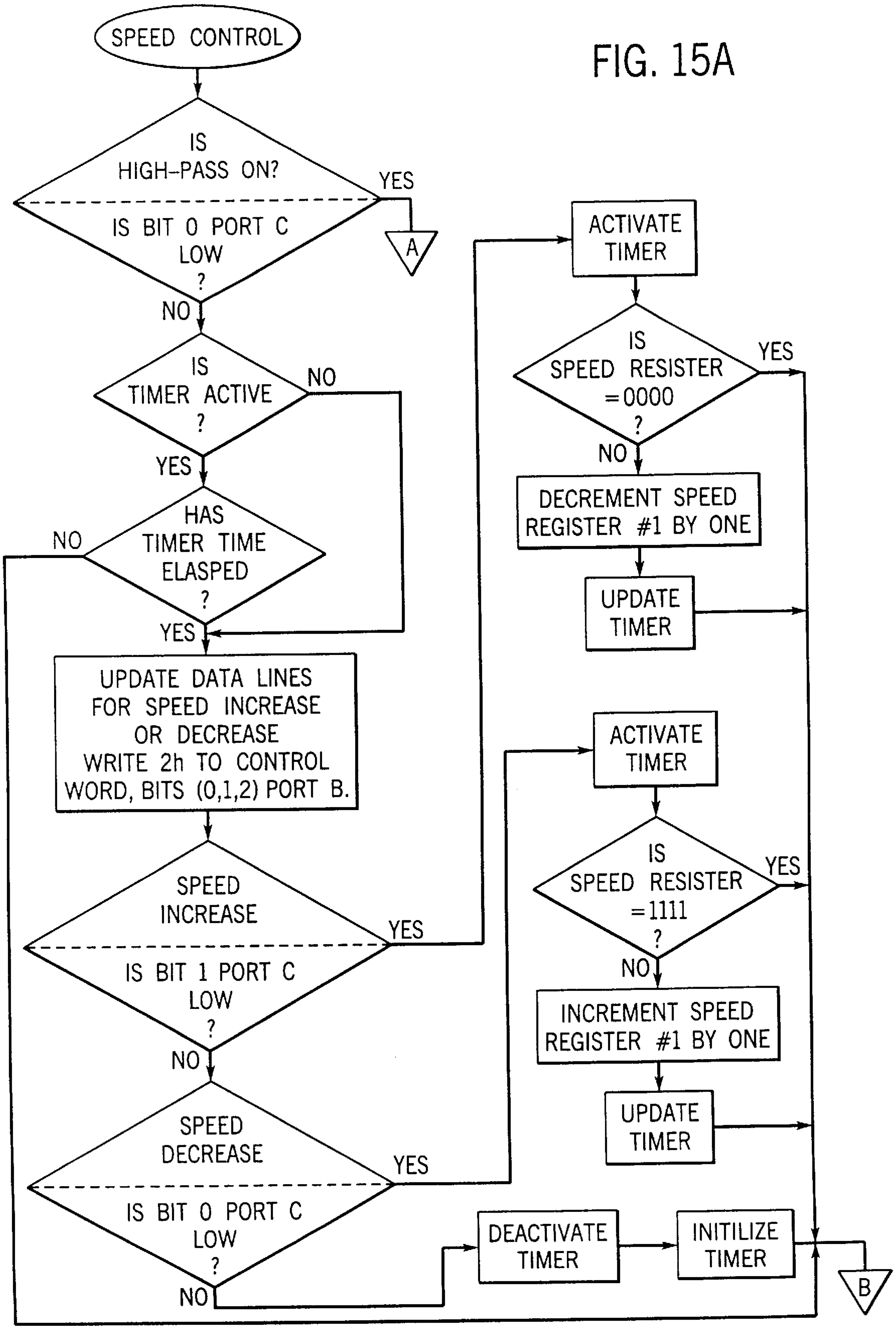
Figure 15B:
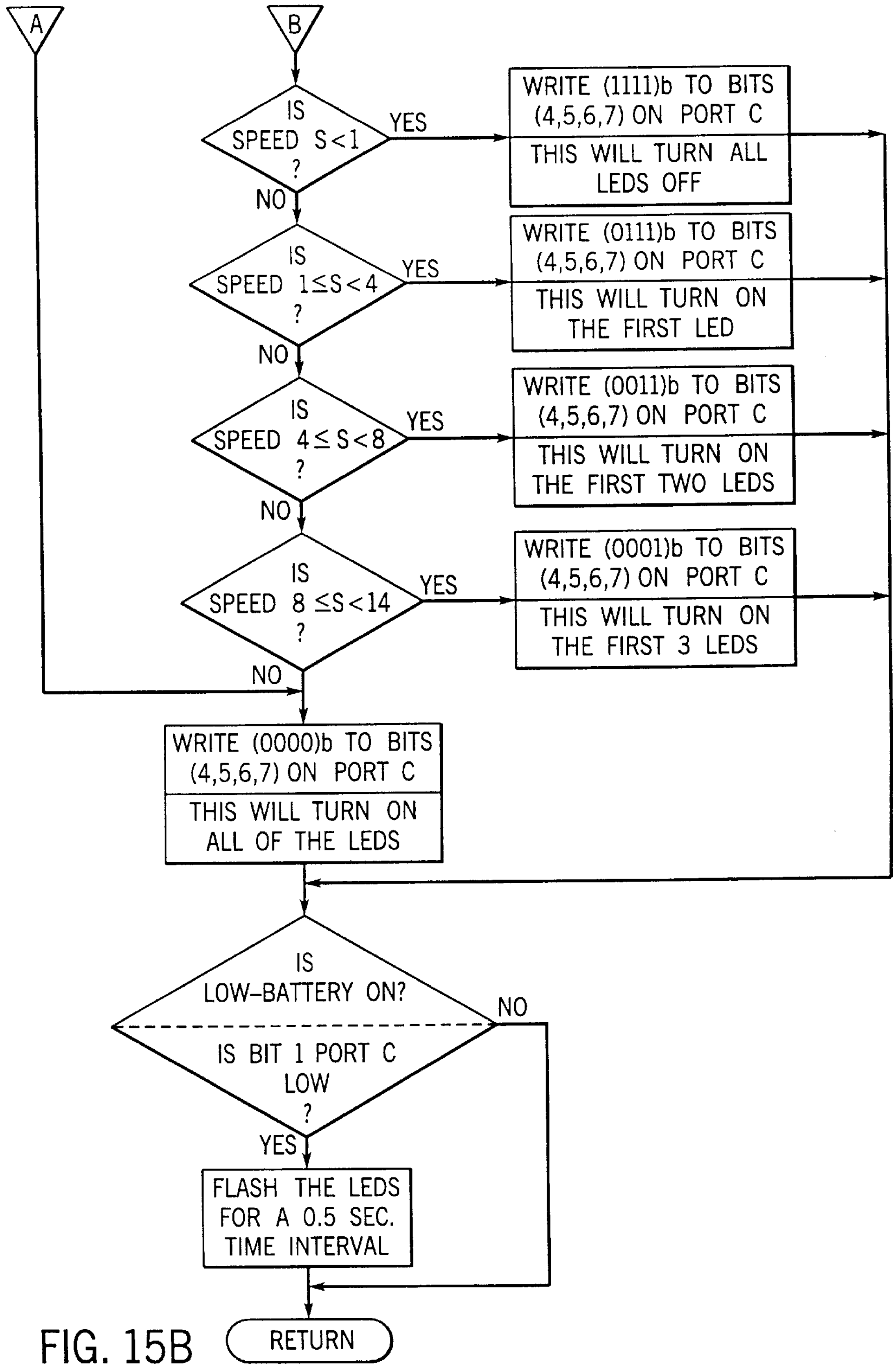

Referring to FIGS. 15A and 15B, a flow diagram illustrates operation of the speed control sub-routine of the block 312 of FIG. 11. This sub-routine is operable to determine speed of the trolling motor 50 using pulse width modulation control of the dura-amp drive circuit 202. Particular, the routine is operable to increment or decrement the PWM output, as commanded, and to turn on the appropriate indicating LED's according to the commanded speed.

Figure 16A:
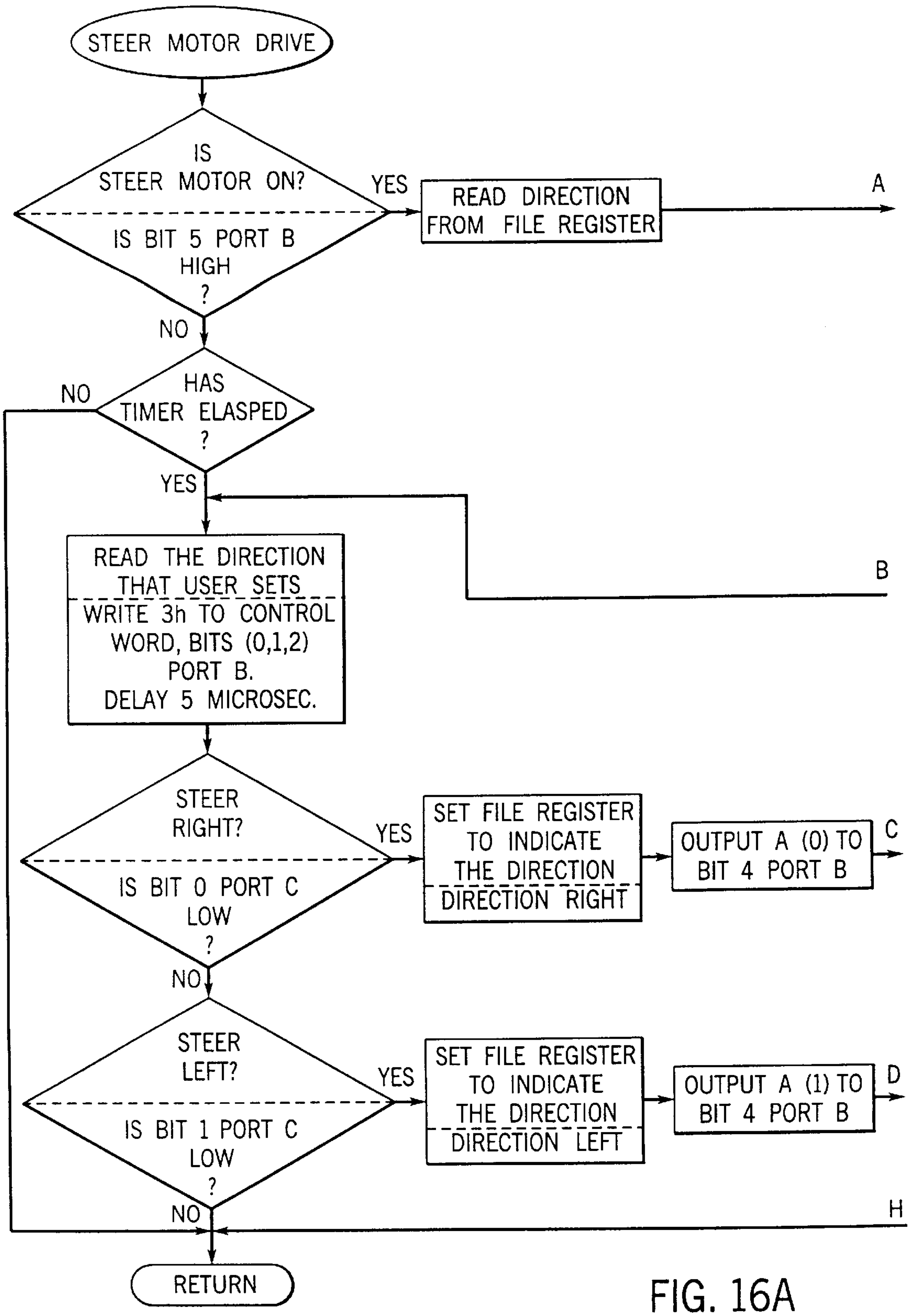
FIGS. 16A and 16D comprise a flow diagram of a steer motor drive subroutine of the main routine of FIG. 11.
Figure 16B:
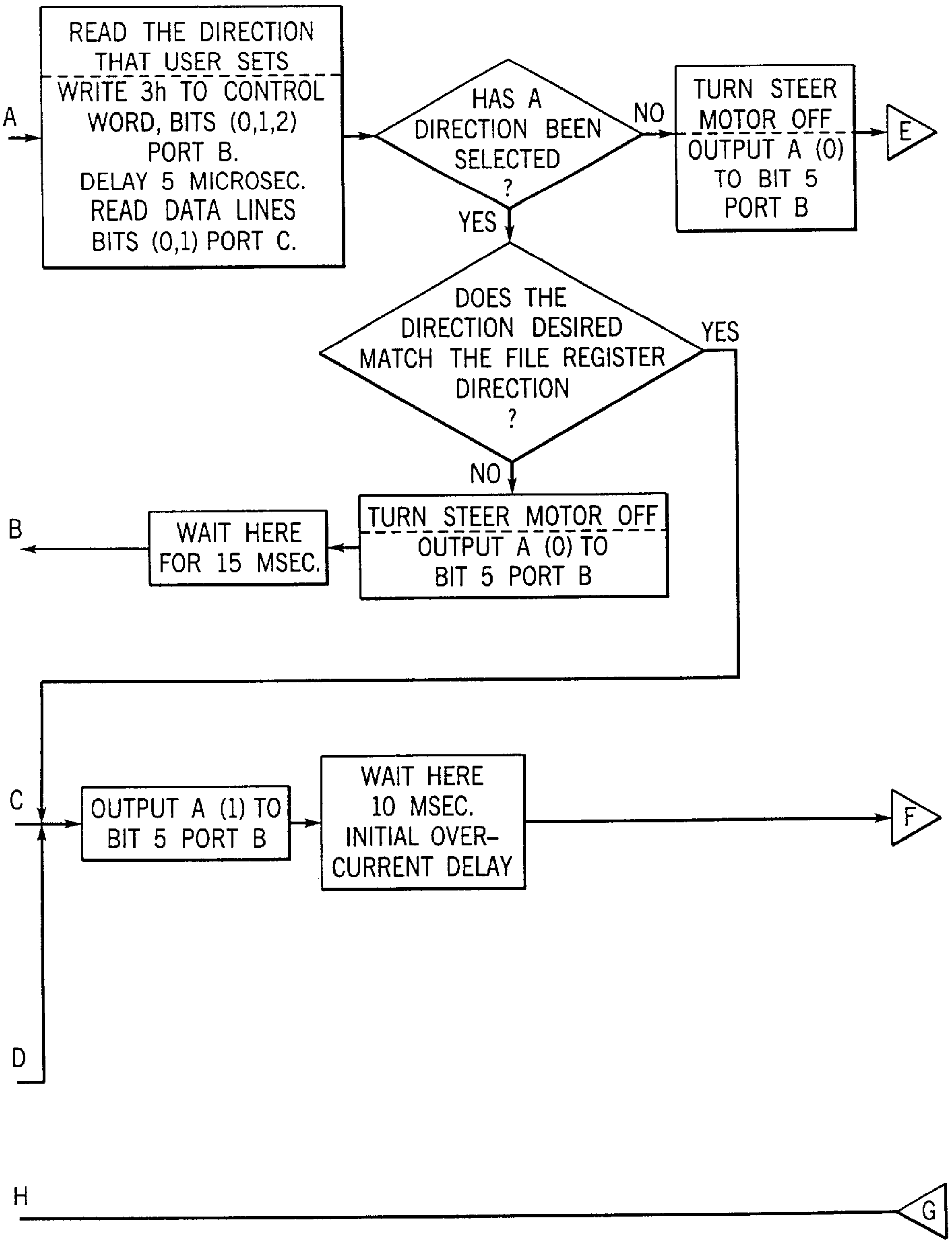
Figure 16C:
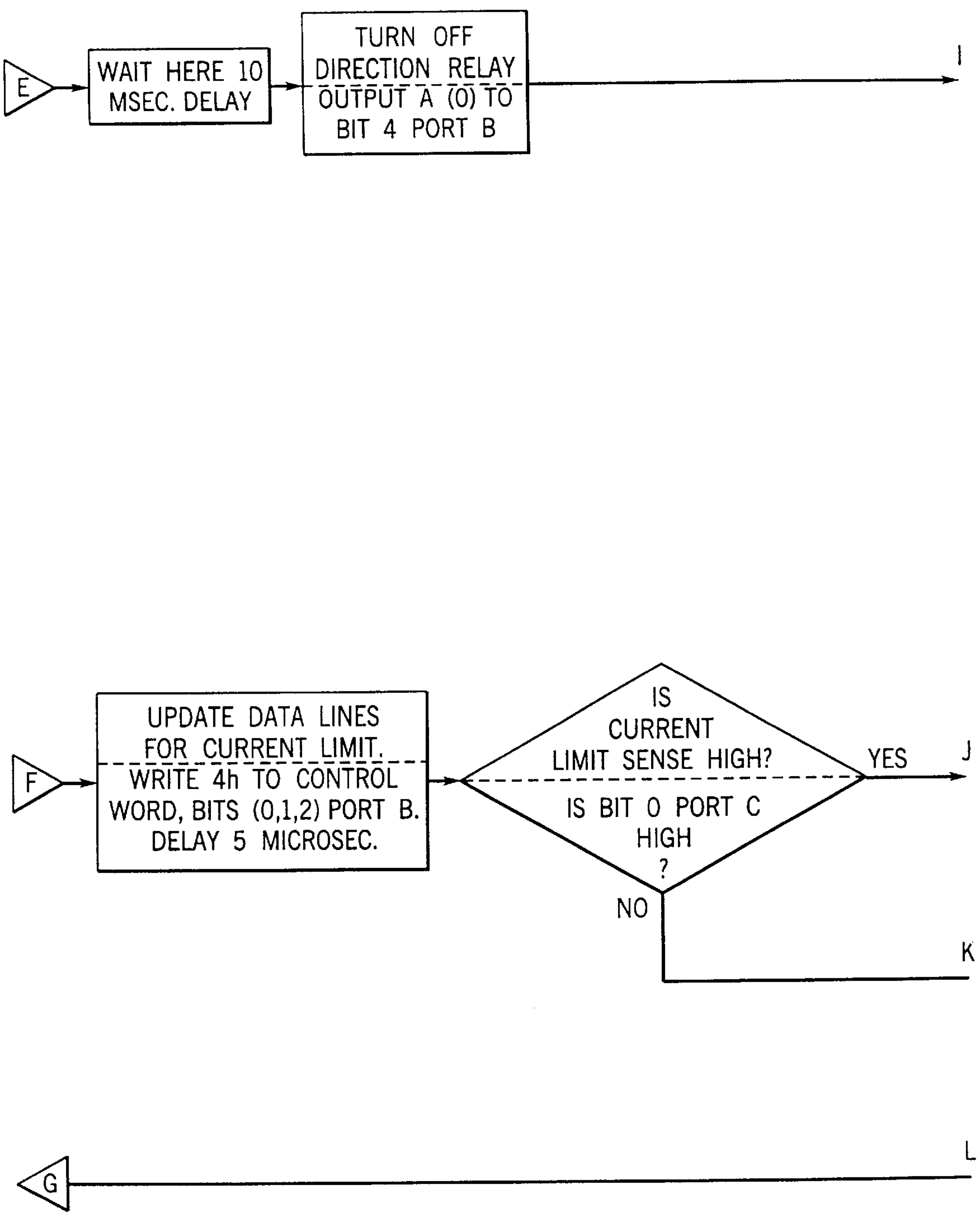
Figure 16D:
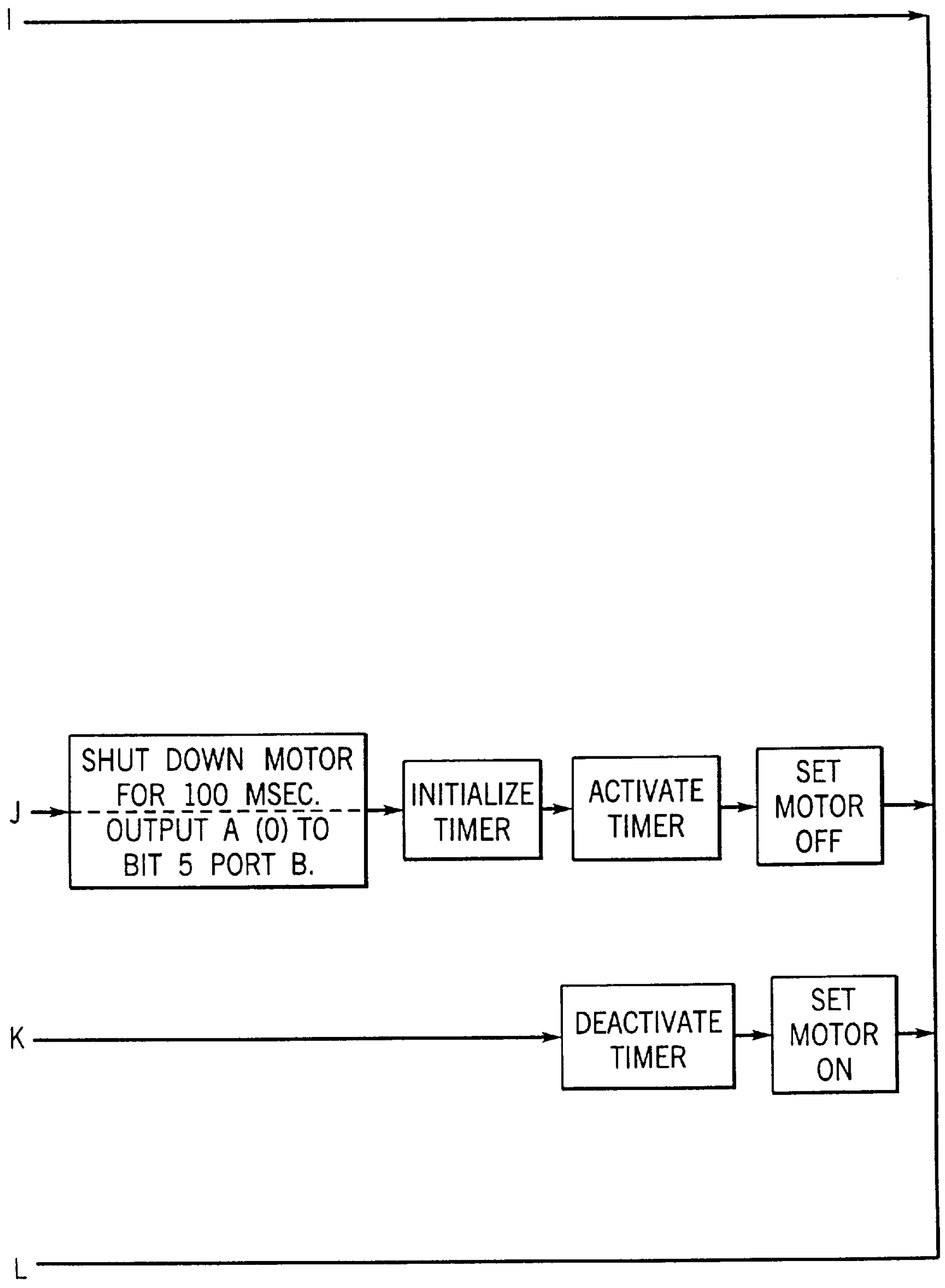

Referring to FIGS. 16A and 16B, a flow diagram illustrates operation of the steer motor drive sub-routine of the block 314 of FIG. 11. This routine is used for controlling operation of the steering motor 70 to satisfy directional requirements. Particularly, this routine is used to turn the steering motor on or off as necessary to change or maintain position, and then command the steering motor to an appropriate position by controlling the directional relay RLY2 of FIG. 10. This circuit is operated when necessary to command the steering motor 70 based on commands received from the foot pedal 36 or based on operational requirements, such as parking or returning the trolling motor to the operative position.

Figure 17A:
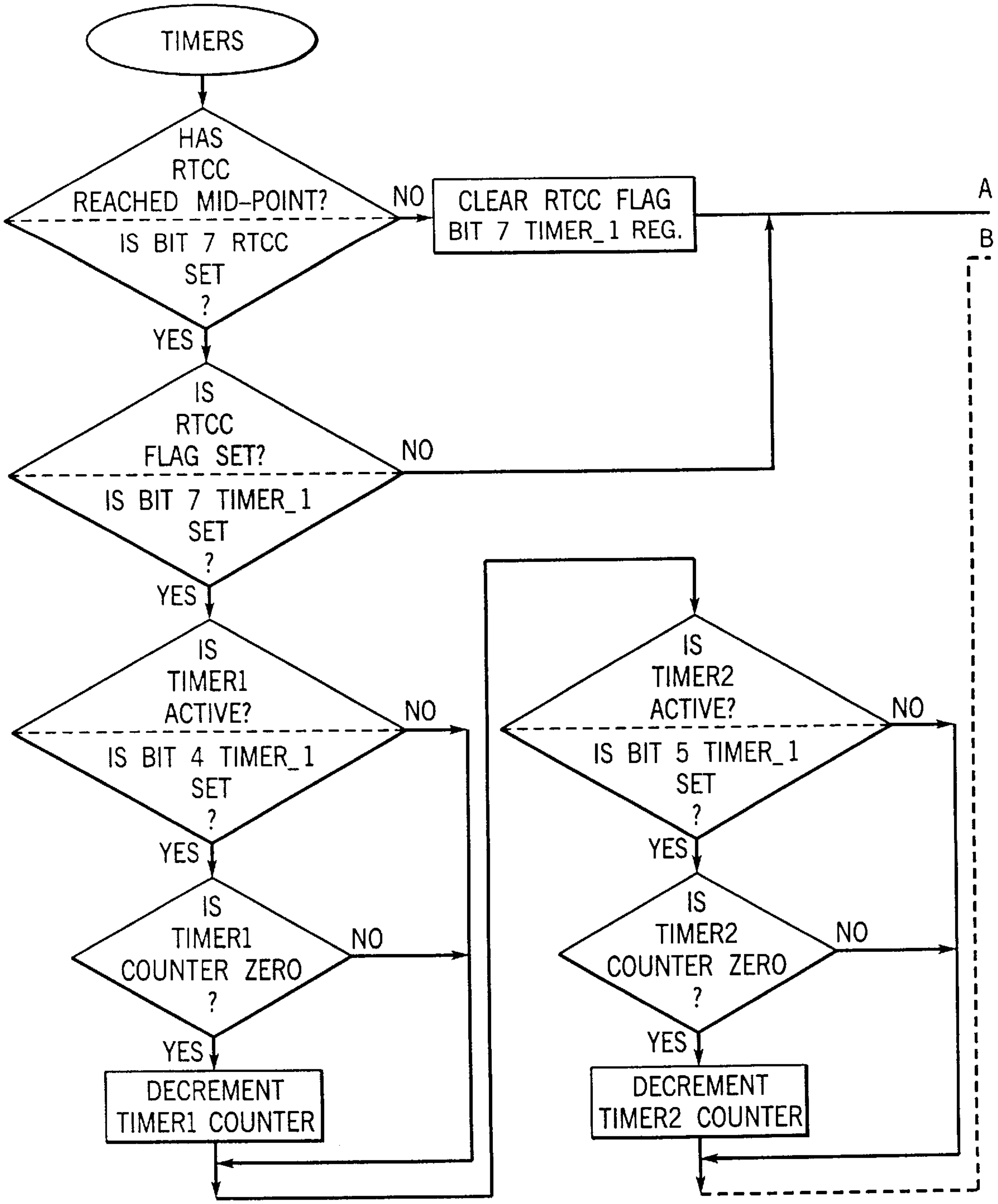
FIGS. 17A–17B comprises a flow diagram of a timer's routine of the main routine of FIG. 11.
Figure 17B:
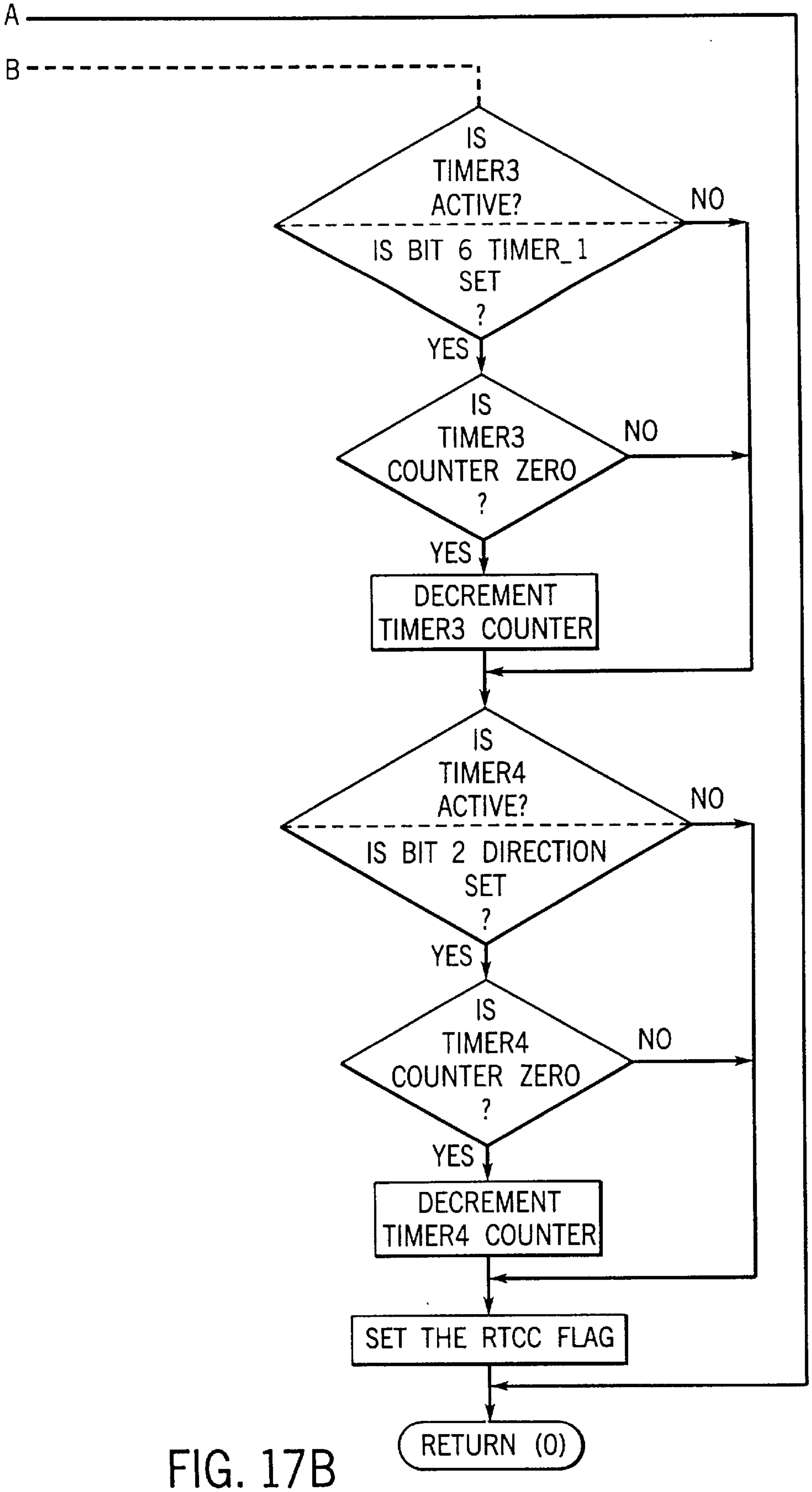

Referring to FIG. 17, a flow diagram illustrates operation of the timer sub-routine implemented at the block 320 of FIG. 11. This is a basic routine used for up-dating timers for use by the various sub-routines.

A detailed description follows on the features of the remote control. Some of the features can be summarized as follows.

The trolling motor functions, foot pedal on/off and battery status are transmitted in a serial data stream in approximate real time.

With the disclosed invention there is discrimination between two different trolling motors and one trolling motor does not prevent control of another nearby trolling motor. The present design includes over sixty-five thousand different transmitter channels. Each trolling motor has its own channel and will not respond to other foot pedals on different channels.

With remote control of a trolling motor having a constant on feature, there is a possibility that if the foot pedal is lost overboard the trolling motor will continue to run. This problem is overcome by the transmitter circuit emitting a "heartbeat" signal periodically to let the receiver know that the foot pedal 36 is within communication range. If the foot pedal 36 is lost overboard, the trolling motor 34 will shut off and park automatically due to loss of the heartbeat signal.

For channel selection the operator must simply turn on the foot pedal 36. Programming of the transmitter channel is done during initial programming of the microcontroller U3 of FIG. 8. The receiver circuit is programmed for the appropriate channel number when the foot pedal 36 is turned on. This is done automatically each time the foot pedal 36 is turned on and is held in memory of the receiver until power is removed from the trolling motor 34. A second foot pedal channel number can also be loaded into memory by turning that foot pedal on within about 7½ seconds. This permits two remote foot pedals on different channels to control one trolling motor.

The RF Electric Steer Motor Control System enables the user to control a Steering Motor via foot-pedal switches without the need for a direct connection between the foot pedal and the motor control electronics. The system comprises two separate hardware/software designs, as described below:

The transmitter unit of FIG. 8 consists of a circuit board containing a PIC 16C55 microcontroller (from Microchip Technology, Inc.), RF transmission hardware, support hardware, and a battery. The microcontroller is programmed with appropriate software. Each transmitter unit interfaces directly to a foot pedal 36, which consists of eight user-activated switches used to control the electric steer motor and foot-pedal power. The transmitter unit transmits current switch status and other status information to the associated receiver unit at appropriate times.

The receiver unit of FIG. 9 consists of a circuit board containing a PIC 16C55 microcontroller, RF reception hardware, and support hardware. The microcontroller is also programmed with appropriate software. The receiver unit interfaces directly to control electronics in the motor housing, and conveys the received status from the associated transmitter unit(s) to the control electronics. The receiver unit receives its power from the electric steer motor's power source.

The transmitter unit transmits message packets to the receiver unit. Included in the message packet is an address sequence and a data sequence. The address sequence is a unique address assigned to each transmitter unit. The receiver uses this address to distinguish among multiple transmitters operating in the same vicinity. The data sequence represents the current status of seven of the eight foot pedal switches, the on/off switch being excluded. The data sequence also includes transmitter status indicating the power state of the foot pedal and status of the battery. Each message packet takes approximately four milliseconds to transmit. Message packets are always transmitted in message bursts. A message burst consists of two message packets preceded by a run-in. A run-in comprises a fifty microsecond high followed by fifty microsecond low. Since a message packet takes four milliseconds to transmit, a complete message burst takes approximately 8.1 milliseconds to transmit.

Transmitter Operation

The primary purpose of the transmitter unit is to convey foot-pedal switch and power status, as well as transmitter battery status, to the receiver unit via the RF link. Additional functions of the transmitter unit are:

1) To account for the operation of other transmitter units in the same vicinity by:
   - Transmitting its unique 16-bit address (serial Number) when pedal power is first applied, and subsequently in every transmission containing status information;
   - Inserting pseudo-random delays between transmissions.
2) To automatically shut down the transmitter unit after an extended period of inactivity.

An "ordinary transmission sequence" begins when a foot-pedal switch (other than PEDAL ON/OFF) is pressed by the user. Message bursts are sent as long as at least one foot-pedal switch remains pressed. A pseudo-random delay of between 32.8 and 65.5 ms is inserted between bursts. Since all transmitter units share the same RF frequency, this permits other transmitters in the vicinity to transmit in the clear. When all foot-pedal switches are released by the user, eight additional message bursts are sent (including pseudo-random delays) before the transmitter sequence completes.

The pseudo-random number generator implemented in the transmitter unit uses a linear congruential algorithm with a period of $2^{16}$. The multiplier constant is the prime number 17713, and the adder is the transmitter's 16-bit address. For addresses that are a multiple of 512, one less than the transmitter's address is used as the adder. In all cases, the original seed (the original "Previous PRN" below) is the transmitter's address. The formula is:

Next PRN=Previous PRN*17713+TA where PRN stands for "pseudo-random number" and TA stands for "transmitter address" (note that the transmitter address less 1 is added when TA is a multiple of 512). Only the low-order 16 bits of the calculated "Next PRN" are retained for the next calculation. The high-order 8 bits of the retained "Next PRN" are used directly to produce a pseudo-random delay of between 32.8 and 65.5 ms.

When the user turns on the foot pedal by pressing the PEDAL ON/OFF switch, the transmitter sends an "address-acquisition transmission sequence". This sequence consists of a series of message bursts (with pseudo-random delays) that differ from ordinary message bursts in that all switches (CONSTANT ON through HI BYPASS) are reported as pressed. The address bits, foot-pedal power state bit, and battery status bit are reported accurately. This transmission sequence is used by the receiver unit to learn the address(es) of the transmitter(s) to which it will respond. A complete address-acquisition sequence consists of eight message bursts. However, if a switch is pressed before the sequence completes, the transmitter will continue to send address-acquisition bursts. When all switches are released, eight additional bursts are sent before transmission ceases and the sequence completes.

The transmitter will begin sending ordinary transmission sequences at the appropriate times following completion of the address-acquisition sequence.

Discrimination of two RF control trolling motors 34 operating in close proximity to one another must be provided because two transmitters operating at the same frequency (about 300 MHz) could result in one transmitter overriding the reception of the other receiver. This would mean that if two boats approach each other that each could override the other receiver and that they could not move apart until one stopped transmitting. This might be a problem since the range of the transmitters is about one hundred feet. A large number of channels prevents one transmitter from controlling another trolling motor. The problem is overcome by transmitting a small percentage of the time, about twelve to twenty-five percent, and also randomly selecting this time. This leaves about eighty percent of the time for other trolling motors to communicate. Since the transmission of each trolling motor is random, multiple trolling motors can communicate in close proximity to one another without interference. Each receiver will lock in on the strongest signal.

Ordinarily, a user turns off the foot pedal by pressing the PEDAL ON/OFF switch while the foot-pedal is powered up. However, to guard against the battery drain that would result from the user forgetting to turn off the unit, the transmitter will automatically turn itself off after a lengthy period of no switch activity. This period can vary from 2.7 to 5.1 hours, depending on ambient temperature—the higher the temperature, the longer the period.

When the transmitter automatically turns itself off, it transmits eight message bursts (with pseudo-random delays) before actually shutting down. In these transmissions, as in those resulting from the user turning off the foot pedal via the PEDAL ON/OFF switch, the power state of the foot pedal is reported as OFF.

Receiver Operation

The primary purpose of the receiver unit is to convey foot-pedal switch and power status, as well as transmitter battery status, to the motor control electronics as received from the associated transmitter unit(s). Additional functions of the receiver unit are:

- To detect and discard incorrectly-received message packets;
- To account for the operation of other transmitter units in the same vicinity by responding only to one or two transmitters whose 16-bit addresses are learned via address acquisition; and
- To automatically cancel the activation of momentary switches in the event that RF transmissions explicitly cancelling them are lost.

A received message packet is discarded if it exhibits any of the following properties:

- There is significant error in the length of the sync, preamble, or any data bit, or if the Manchester encoding is improper.
- The Address Sequence present in the packet is all zero.
- The Current Switch Status and Current Switch Status Repeated sections of the packet do not agree.
- The Transmitter Status and Transmitter Status Repeated sections of the packet do not agree.

When the receiver unit is powered up, it does not know the 16-bit address(es) of the transmitter(s) to which it should respond. It therefore discards all incoming RF message packets until it can learn the address(es) via address-acquisition packets.

When two identical address-acquisition packets are received, the receiver unit internally stores the 16-bit address contained in the packets. It will then begin to respond to ordinary transmissions received from the same transmitter.

At the time the first address is stored, the receiver also starts a 7.5-second timer. If a second pair of identical address-acquisition packets are received within this 7.5-second period, and the address in the packets is different from the stored address, then the receiver internally stores this new address as well. The receiver will then begin to respond to ordinary transmissions received from either transmitter. Note that a second address will not be stored if it is received after the 7.5-second period.

In the manner described above, the receiver enables the steer motor to be controlled by one or two foot pedals. The address or addresses learned via address acquisition will be retained until power to the receiver unit is removed. While it is possible that inadvertent storage of a transmitter address other than that (those) of the intended transmitter(s) could occur during address acquisition, this possibility can be virtually eliminated if the user observes the following procedures:

Power to the receiver and transmitter units should be applied while not in the vicinity of other transmitters powering up;

Power to the receiver unit should be applied before power is applied to the foot pedal(s);

If a second foot pedal is to be used, power to it must be applied within 7.5 seconds of applying power to the first pedal.

The manner in which the steer motor is controlled by two foot pedals is the subject of the next section.

Certain ambiguities arise when the steer motor is being controlled by two foot pedals. This is due to the fact that two complete sets of switch (and other) status must be reported as a single set to the control electronics. When functioning with two foot pedals, the receiver unit resolves these ambiguities as follows:

If either transmitter is reporting that its foot pedal is powered on, then PEDAL ON/OFF status is reported as ON to the control electronics.

If either transmitter is reporting a batter-low condition, then battery-low status is reported to the control electronics (see below).

If either transmitter reports in its switch status that a particular switch is pressed, then that switch is reported as pressed to the control electronics. In essence, the active statuses from each transmitter are Ored together before being reported to the control electronics.

To report a low-battery indication to the control electronics, the receiver unit simply toggles the state of the PEDAL ON/OFF signal at a 1-Hz rate. The receiver unit resumes signalling a steady HIGH or LOW if the low-battery condition is removed.

Certain steer-motor actions begin when a particular switch is pressed by the user, and end when the same switch is released. The switches that control these actions are called "momentaries", and are treated differently from non-momentaries by the receiver unit.

The reason that momentaries must be treated specially is that multiple message packets reporting their status as released might be lost or discarded. In this event, it is necessary to detect the message loss and report to the control electronics that the momentaries have been released.

The switches designated as momentaries are:

LEFT TURN
INCREASE MOTOR SPEED
THRUST MOTOR ON/OFF
AUXILIARY
DECREASE MOTOR SPEED
RIGHT TURN

Whenever a report is made to the control electronics that any momentary is pressed, or continues to be pressed, the receiver unit starts a 250-ms timer. If a report is made that all momentaries are released, the timer is stopped. If the timer expires, which could only occur as the result of lost transmissions, then the timer is stopped and a report is made to the control electronics that all momentaries are released.

The purpose of this system is to enhance the controllability of a trolling motor. More specifically, to incorporate the use of an RF connected remote control system into the embodiment of a trolling motor to control speed, steering and other functions.

The remote control system is to be used in severe service conditions (marine environment). The primary power source is 12 volts DC, nominal, from one 12 volt, 105 amp hour, marine lead acid storage battery for the 12 V unit, 24 volts DC, nominal, from two 12 volt, 105 amp hour, marine lead acid storage batteries for the 24 V unit and 36 volts DC, nominal, from three 12 volt, 105 amp hour, marine lead acid storage batteries for the 36 V unit.

The output drive is 48 lb-in torque minimum, bi-directional at 12 V, 24 V or 36 V source. It must have 12 RPM minimum as measured at the column and 380 to 400 degrees total rotation.

The indicator drive is 3 lb-in torque minimum, bi-directional at specified source voltage. Drive angle is to be the same as output drive.

The geartrain consists of a 12 V, 24 V or 36 V electric motor, clutch, mechanical stops, output drive and indicator drive.

The electric motor is a bi-directional, permanent magnet, 12 V, 24 V or 36 V electric motor of appropriate size to fit housing and supply sufficient torque and RPM to the geartrain to produce the specified output.

The system comprises a remote foot pedal (FP) powered by a standard 9 V battery and RF linked to the trolling motor 34 by an RF transmitter and receiver. The receiver located in the trolling motor head receives commands from the foot pedal and provides input for electronics to control the following functions: Thrust motor on/off, left steering, right steering, constant on/momentary, hi-bypass, increase speed, decrease speed, one undefined function, communication verification indicator, FP power on/low battery. The left and right steering shall be accomplished by a motor driven gear box coupled to the trolling motor column. The lower unit provides thrust and uses PWM to control speed.

The foot pedal uses nine membrane switches to provide input to the transmitter for the functions shown below. Each function is activated by switch closures and configured as shown in the drawing. All foot pedal switches have a common ground and thus provide an "active low" input to the transmitter.

The transmitter is in the remote foot pedal and powered by a standard 9 V Alkaline or Carbon Zinc battery. The transmitter receives inputs from the foot pedal switches (9) and a low battery input. Each switch input must be "debounced" by at least 20 ms to prevent contact bounce during closure.

The transmitter transmits the following information to the receiver in approximately real time (no noticeable delay): nine switch functions for control of trolling motor direction and speed plus two status functions for "power on" and "low battery". The transmitter is "asleep" until the "power on" switch is pressed. At that time the transmitter sends a communication packet to the receiver that the foot pedal has been turned on. The transmitter then goes back to sleep waiting for other functions to be selected. At that time the transmitter transmits another communication packet to the receiver. If the "power on" has not been selected prior to other switch closures then the transmitter remains asleep and does not respond. Each time a switch is pressed the transmitter transmits a complete communication packet as long as the function is selected.

The range of the transmitter/receiver is 40 feet minimum. The transmitter antenna is a small PWB track.

The frequency selected minimizes interference from and interference with other electronic equipment in close proximity such as: Depth Finders, Radio receivers and transmitters (Wallie-Talkie, VHF and UHF), GPS receivers, garage door openers, etc. The transmission modulation method minimizes interference from and interference from and interference with other electronic equipment in close proximity. It provides for communication discrimination between two RF connected Foot Pedals equal distant from the receiver. This means that, if two boats are next to each other and choose to move apart at the same time that each can do so without interference from the other assuming that they are on different channels.

Power is provided by a standard 9 V Alkaline or Carbon Zinc battery. The current drain during the "sleep" mode is less than 700 microamps and during transmission is less then 25 milliamps average. Reverse battery protection is provided to protect the transmitter. During battery replacement the transmitter micro is reset.

The receiver is located in the trolling motor head along with its antenna (length of wire). It receives information from the remote FP and provides active "low" outputs. The head is plastic. The receiver is supplied an unfiltered and unregulated +12 V DC for the 12 V unit and a filtered and regulated +15 V for the 24 V or 36 V unit from the control electronics board also located in the head.

During power up the receiver sets all outputs to high and the channel code flag to zero until communication is established with the foot pedal. The receiver circuit has an input filter with a band width sufficient to permit reception of desired signal and reject signals from other electronic equipment in close proximity (depth finders, VHF and UHF transmitters, outboard motors, garage door openers, thrust motor, direction motor, other RF connected foot pedals, etc.).

The power on indicator output provides an "active low" to turn on a green LED to indicate that the foot pedal is turned on. This LED remains illuminated until the bit is reset indicating that the FP power on switch has been depressed again or when the foot pedal turns itself off. This LED also provides "low FP battery indication" by flashing on and off at 1 second intervals when the low battery bit is set.

When the receiver board is installed the Receiver Board Present pin is tied low, indicating that this is a RF version and not a cable connected version. This indicates to the control electronics which software routine is to be used.

Each output provides an active "low" and must be capable of sinking a minimum of 3 milliamps. Each output pin will go to a High Z state if not active (except pin #6, which is always configured as an output).

The motherboard control electronics are housed in the plastic head of the trolling motor along with the receiver and steering gear box. It takes the outputs from the receiver and provide steering and thrust motor speed control plus status indication of FP power on, FP low battery thrust motor low battery and communication verification. Each input is "debounced" by at least 20 ms to prevent contact bounce during closure of foot pedal switches on cord connected model.

The control electronics provides logic functions such that:

1. When the left and right switches are pressed at the same time only one will be acted upon.
2. When the increase and constant on switches are depressed at the same time the increase function will be selected.
3. When the decrease and hi-bypass switches are pressed at the same time the decrease function will be selected.

When commanded to turn, the control electronics provides a plus (CW) or negative (CCW) voltage to the steering motor as long as the left (CCW) or right (CW) FP switch is pressed. A mechanical stop limits rotation to 380 to 400 degrees and stalls the steering motor at the end of travel. The control electronics provide current limit (2.5A for 12 V, 1A for 24 V and 0.8A for 36 V) to protect steering motor during the stall condition. The current limit is set to provide protection during stall. The steering motor provides 360 degree rotation in less than six seconds with the thrust motor on its highest speed. Upon power up with trolling motor in the run position, the lower unit remains in its last position until directed to change by pressing the left or right FP switches.

The speed control provides variable speed plus constant on/momentary and hi-bypass functions.

The variable speed control is provided by PWM control of the motor 50. The variable speed is set by pressing the increase or decrease switches on the foot pedal 36. The speed will change in sixteen (0–100% duty cycle) increments by depressing either the increase or decrease switches. When the controls are at increment 0 (minimum speed control), the PWM chip is disabled and there is 0 V applied to the gate signal. On increment 1, the motor starts turning. It can be ramped one step at a time by quickly pressing and releasing either switch or ramped up/down at a non-linear rate by continuing to press either switch. The rate must be able to be changed later if field testing indicates that a change is required.

The speed is indicated by four red LEDs which shall be progressively lit at approximately 10%, 20%, 50% and 70% of thrust. The speed LEDs shall also indicate a low supply voltage condition when the thrust motor is not operating by flashing at a 0.5 second rate when voltage drops below 11.99 V (+/-0.16 V) for the 12 V unit, 23.98 V (+/-0.16 V) for the 24 V unit and 35.97 V (+/-0.16 V) for the 36 V unit. The speed LEDs will also flash at this same rate if, while the thrust motor is operating, the supply voltage reaches 9.5 V (+/-0.25 V) for the 12 V unit, 18 V (+/-0.25 V) for the 24 V unit and 24 V (+/-0.25 V) for the 36 V unit. For both cases, this will be a continuous indication as long as any of the speed LEDs are lit.

The "constant on/momentary" is a toggle function such that if this switch is pressed it will override the thrust motor on/off switch and hold the thrust motor constant on at the selected speed (variable or hi-bypass). If this switch is pressed again the normal momentary on/off operation resumes. Upon power up this function is set to momentary.

"Hi-bypass" is a toggle function such that if this switch is pressed it sets the PWM speed control at the highest speed. Constant on and momentary functions continue to operate but at highest speed. If this switch is pressed again, then hi-bypass is disabled and the speed resumes at the previously selected variable speed. Upon power up the hi-bypass function is disabled.

The park function automatically parks the lower unit in a preset location for stowing on the mount and initiates a kill function. The park function is activated by either of two inputs.

A 45 degree mercury switch located in the trolling motor head will open during stow of the lower unit, thus driving the lower unit in the CCW direction until the mechanical stops prevent further travel. The mercury switch is electronically delayed by approximately 2 seconds to prevent operation during use in the run position in rough water. The lower unit then rotates CW for approximately 60 milliseconds to relieve pressure on the geartrain.

When the foot pedal on/off switch is depressed indicating that the foot pedal is being turned off, then the lower unit (thrust motor) is turned full CCW until the mechanical stops prevent further travel. The lower unit then rotates CW for approximately 60 milliseconds to relieve pressure on the geartrain.

For cable connected versions the foot pedal on/off switch is used as a park switch. Whenever this switch is pressed the thrust motor turns full CCW for stowing. The lower unit then rotates CW for approximately 60 milliseconds to relieve pressure on the geartrain.

Upon movement of the trolling motor from the stow position to run position (mercury switch closes), the lower unit rotates in a CW direction for 2.5 seconds (this time should be software adjustable). This movement closely aligns the thrust motor direction with that of the boat. All functions are enabled and normal operation resumes at this time. Upon power up and with the trolling motor in the stowed position, the steering and thrust functions continue to be disabled (kill function active) until the trolling motor is moved to the run position.

The mercury switch also initiates a kill function upon opening after approximately 1 second after park stall. At that time steering and thrust motor functions are disabled. Upon returning the motor to the run position from stow, normal operation resume in 0.3 to 0.5 seconds.

The control electronics illuminate an orange LED each time any foot pedal switch is pressed. This LED remains illuminated while the constant on is active or while the momentary switch is depressed. This provides the user with visual indication that the foot pedal is communicating with the receiver.

An automatic transmitter shutdown is provided in about three hours if no foot pedal buttons have been pressed. The transmitter circuit shuts down after sending out a shutdown signal to the trolling motor, turning off the foot pedal on LED.

The foot pedal 36 uses a membrane switch panel 86. This panel 86 creates a parasitic radiator with the transmitter antenna 130 to improve transmission distance with available antenna power.

The foot pedal 36 has switches that function as momentary and toggle. If communication is lost with the foot pedal and the receiver was not notified that a foot pedal was released, that function could cause the trolling motor to stay in the selected function. For example, if the last switch pressed was "left turn", then if communication were lost the trolling motor would continue to turn left since it did not receive indication that the switch had been released. To eliminate this problem, the software includes automatic cancellation of momentary switches. This is done by starting a 250 millisecond timer in the receiver each time it is reported that a momentary switch is pressed. If after 250 milliseconds the receiver circuit of FIG. 9 does not receive notification that the switch continues to be pressed or the switch is released, the receiver circuit assumes that communication is lost and the receiver reports to the control circuit of FIG. 10 that all switches have been released.

When moving a boat through weeds or the like the operator has to partially raise the motor 34 to "blow" off weeds or go over objects. Once the trolling motor 34 goes past a 45° incline, the control electronics automatically rotates the trolling motor to a stow position. Once the operator has cleared the object, then the trolling motor is lowered back to the "run" position. In accordance with the invention an auto-align feature automatically rotates the trolling motor to approximately straight ahead. This saves the operator time and aggravation. The precise turn time is software adjustable.

With the use of a remote foot pedal connected using RF, the transmitter must be turned on for use of the auto-align feature.

A backtracking feature protects the trolling motor steering gear train from being in a torqued condition for an extended period of time. This can be initiated by either stowing the motor when the mercury switch SW1 opens on the control board, or by hitting the on/off button 100 the foot pedal 36 after the foot pedal has been on. Either of these methods sends a signal to the microcontroller U1 of the control circuit of FIG. 10 that the thrust motor 50 should be turned off and rotated to the stow position. The stow position is located by rotating the lower unit counterclockwise until a mechanical stop is hit. At this time the steering current rises sharply, indicating a stalled condition. The microcontroller U1 then issues a clockwise steer command for approximately fifty milliseconds. This slight movement in the opposition direction relieves the pressure on the gear train.

In accordance with the invention the steering is modulated to avoid left and right turns too fast for operators to make small directional changes. Under the control of the microcontroller U1, the steering transistor Q1 is modulated at fifty percent or some other select value, to give increased steering time, i.e., slower turning, for a set period of time such as, for example, one second. Alternatively, the steering transistor could be modulated with a variable ramp. With either method the steering is desensitized for a select short time to increase control, but not affect the total turn time significantly. Also, the steering time could be changed depending on the thrust of the lower unit. Since the effect on the boat turning time is directly proportional to the thrust of the trolling motor, the steering sensitivity can be changed depending on the actual thrust. Since thrust is proportional to the sixteen bit output from port A of the microcontroller U1, the microcontroller could read this digital signal and change the modulation of the steering transistor Q1 accordingly.

Thus, in accordance with the invention there is disclosed a radio frequency remote control for trolling motors.

We claim:

1. A wireless remote control for a trolling motor system including a trolling motor for mounting on a boat for controlling propulsion of the boat and an associated user control actuable by a user to command operation of the trolling motor, the remote control comprising:

a receiver circuit operatively associated with the trolling motor for receiving radio frequency signals at a select frequency, the radio frequency signal including an address sequence and a data sequence, wherein any user control includes a unique address sequence and the receiver circuit determines if the received address sequence is for the associated user control, and if so controlling the trolling motor in accordance with information contained in the data sequence; and a transmitter circuit operatively associated with the user control, the transmitter circuit transmitting a radio frequency signal at the select frequency, the radio frequency signal including the unique address sequence and the data sequence, the data sequence representing information on the actuated input device, the transmitter circuit includes discriminator means for transmitting the radio frequency signal only a small percentage of the time to avoid interference with other trolling motor systems.

2. The wireless remote control of claim 1 wherein said discriminator means transmits the radio frequency signal about twelve to twenty five percent of the time.

3. The wireless remote control of claim 1 wherein said discriminator means transmits the radio frequency signal at random times.

4. The wireless remote control of claim 1 wherein said transmitter circuit transmits the radio frequency signal only if an input device is actuated by a user.

5. A wireless remote control for a trolling motor system including a trolling motor for mounting on a boat for controlling propulsion of the boat and an associated user control actuable by a user to command operation of the trolling motor, the remote control comprising:

a receiver circuit operatively associated with the trolling motor for receiving radio frequency signals at a select frequency, the radio frequency signal including an address sequence and a data sequence, wherein any user control includes a unique address sequence and the receiver circuit determines if the received address sequence is for the associated user control, and if so controlling the trolling motor in accordance with information contained in the data sequence; and a transmitter circuit operatively associated with the user control, the transmitter circuit transmitting a radio frequency signal at the select frequency, the radio frequency signal including the unique address sequence and the data sequence, the data sequence representing information on the actuated input device, the transmitter circuit includes discriminator means for transmitting the radio frequency signal in repeating message bursts, with a delay between message bursts, the delay being of greater duration then duration of the message bursts to avoid interference with other trolling motor systems.

6. The wireless remote control of claim 5 wherein said discriminator means transmits the message bursts about twelve to twenty five percent of the time.

7. The wireless remote control of claim 5 wherein said discriminator means transmits the message bursts at random times.

8. The wireless remote control of claim 5 wherein said transmitter circuit transmits the radio frequency signal only if an input device is actuated by a user.

9. The wireless remote control of claim 5 wherein said message bursts are approximately 8.1 milliseconds in duration and the delay is pseudo-random between approximately 32.8 and 65.5 milliseconds in duration.

10. The wireless remote control of claim 5 wherein said delay is approximately four to eight times greater in duration than duration of the message bursts.

11. The wireless remote control of claim 10 wherein said delay is pseudo-random.

12. A wireless remote control for a trolling motor system including a trolling motor for mounting on a boat for controlling propulsion of the boat and first and second associated user controls having input devices actuable by users to command operation of the trolling motor, the remote control comprising:

first and second transmitters operatively associated with the respective first and second user controls, each transmitter transmitting a through the air signal including a unique address and a data sequence, the data sequence representing information on actuation status of the input devices;

a receiver operatively associated with the trolling motor for receiving through the air signals, the receiver including means for storing the unique addresses for the first and second transmitters and selector means for determining if a received through the air signal includes one of the stored unique addresses and if so controlling the trolling motor in accordance with information contained in the data sequence.

13. The remote control of claim 12 wherein the receiver storing means includes learning means for learning the unique addresses for the first and second transmitters.

14. The remote control of claim 13 wherein the learning means stores the first two addresses received after power is applied to the receiver.

15. The remote control of claim 14 wherein the learning means stores a second address only if it is received within a select time after a first address.

16. The remote control of claim 14 wherein the storing means retains the stored addresses until power is removed from the receiver.

17. The remote control of claim 12 wherein the receiver is operatively associated with an electronic control that controls the trolling motor in accordance with information contained in the received data sequence.

18. The remote control of claim 17 wherein the receiver ORs the data sequence from the first and second transmitters before transferring information to the electronic control.

19. A wireless remote control for a trolling motor system including a trolling motor for mounting on a boat for controlling propulsion of the boat and first and second associated user controls having input devices actuable by users to command operation of the trolling motor, the remote control comprising:

first and second transmitters operatively associated with the respective first and second user controls, each transmitter transmitting a through the air signal including a unique address and a data sequence, the data sequence representing information on actuation status of the input devices;

a receiver operatively associated with the trolling motor for receiving through the air signals, the receiver including means for storing unique addresses for up to two transmitters, learning means associated with the storing means for learning the unique addresses for the first and second transmitters for storage by the storing means, and selector means for determining if a received through the air signal includes one of the stored unique addresses and if so controlling the trolling motor in accordance with information contained in the data sequence.

20. The remote control of claim 19 wherein the learning means stores the first two addresses received after power is applied to the receiver.

21. The remote control of claim 20 wherein the learning means stores a second address only if it is received within a select time after a first address.

22. The remote control of claim 20 wherein the storing means retains the stored addresses until power is removed from the receiver.

23. The remote control of claim 19 wherein the receiver is operatively associated with an electronic control that controls the trolling motor in accordance with information contained in the received data sequence.

24. The remote control of claim 23 wherein the receiver ORs the data sequence from the first and second transmitters before transferring information to the electronic control.

25. A wireless remote control for a trolling motor system including a trolling motor for mounting on a boat for controlling propulsion of the boat and first and second associated user controls having input devices actuable by users to command operation of the trolling motor, the remote control comprising:

first and second transmitters operatively associated with the respective first and second user controls, each transmitter transmitting a through the air signal uniquely identifying the transmitter and including data representing information on actuation status of the input devices;

a receiver operatively associated with the trolling motor for receiving through the air signals, the receiver including means for determining if a received through the air signal uniquely identifies only the first or the second transmitter and if so controlling the trolling motor in accordance with the received data.

26. The remote control of claim 25 wherein the receiver includes means for storing addresses uniquely identifying up to two transmitters.

27. The remote control of claim 26 wherein the receiver storing means includes learning means for learning unique addresses for the first and second transmitters.

28. The remote control of claim 27 wherein the learning means stores the first two addresses received after power is applied to the receiver.

29. The remote control of claim 28 wherein the learning means stores a second address only if it is received within a select time after a first address.

30. The remote control of claim 29 wherein the storing means retains the stored addresses until power is removed from the receiver.

31. The remote control of claim 25 wherein the receiver is operatively associated with an electronic control that controls the trolling motor in accordance with information contained in the received data.

32. The remote control of claim 31 wherein the receiver ORs the data from the first and second transmitters before transferring information to the electronic control.

33. A wireless remote control for a trolling motor system including a trolling motor for mounting on a boat for controlling propulsion of the boat and an associated user control having input devices actuable by a user to command operation of the trolling motor, the remote control comprising:

a receiver operatively associated with the trolling motor for receiving a through the air signal and controlling the trolling motor in accordance with information contained in the signal; and a housing associated with the user control housing the input devices, a transmitter operatively associated with the user control, the transmitter transmitting a through the air signal representing information on actuation status of the input devices, and a battery for powering the transmitter, the transmitter including shut down means for turning the transmitter off if no input device is actuated for a select period of time.

34. The remote control of claim 33 wherein one of the input devices comprises an on/off switch, the transmitter reporting status of the on/off switch as off to the receiver prior to turning off the transmitter.

35. The remote control of claim 33 wherein the period of time varies directly with temperature.

36. The remote control of claim 33 wherein the user control comprises a foot pedal and the input devices control propulsion and steering of the trolling motor.

37. The remote control of claim 33 wherein the through the air signal comprises a radio frequency signal.

38. The remote control of claim 37 wherein the radio frequency signal includes an address uniquely identifying the transmitter and a data sequence representing actuation status of the input devices.

39. In a trolling motor system including a trolling motor for mounting on a boat for controlling propulsion of the boat and an associated user control having input devices actuable by a user to command operation of the trolling motor, a remote control comprising:

a receiver operatively associated with the trolling motor for receiving a radio frequency signal and controlling the trolling motor in accordance with information contained in the signal; and a housing associated with the user control supporting the input devices and housing a membrane switch panel positioned for actuation by the input devices and a transmitter electrically connected to the membrane switch panel for developing a radio frequency signal representing information on actuation status of the input devices, the transmitter including an antenna located in the housing proximate the membrane panel to create a parasitic radiator.

40. The remote control of claim 39 wherein the housing comprises a base and switch cover defining an interior space, the membrane switch panel being supported on the base in said interior space, the input devices comprising elastomeric members operatively associated with the switch cover for selectively engaging the membrane switch panel.

41. The remote control of claim 40 wherein the input devices comprise an elastomer pad disposed between the switch panel and the switch cover with portions of the pad being exposed through openings in the switch cover.

42. The remote control of claim 40 wherein the membrane switch panel includes a discrete switch associated with each input device.

43. The remote control of claim 40 wherein the base includes a circuit housing on an underside of the base, below the membrane switch panel, and the transmitter comprises a transmitter circuit board in the circuit housing.

44. The remote control of claim 39 wherein the antenna comprises an antenna loop.

45. In a trolling motor system including a trolling motor for mounting on a boat for controlling propulsion of the boat and an associated foot pedal having input devices actuable by a user to command operation of the trolling motor, a remote control comprising:

a receiver operatively associated with the trolling motor for receiving a radio frequency signal and controlling the trolling motor in accordance with information contained in the signal; and the foot pedal including a housing supporting the input devices and housing a membrane switch panel positioned for actuation by the input devices and a transmitter electrically connected to the membrane switch panel for developing a radio frequency signal representing information on actuation status of the input devices, the transmitter including an antenna located in the housing proximate the membrane panel to create a parasitic radiator.

46. The remote control of claim 45 wherein the housing comprises a base and switch cover defining an interior space, the membrane switch panel being supported on the base in said interior space, the input devices comprising elastomeric members operatively associated with the switch cover for selectively engaging the membrane switch panel.

47. The remote control of claim 46 wherein the input devices comprise an elastomer pad disposed between the switch panel and the switch cover with portions of the pad being exposed through openings in the switch cover.

48. The remote control of claim 46 wherein the membrane switch panel includes a discrete switch associated with each input device.

49. The remote control of claim 46 wherein the base includes a circuit housing on an underside of the base, below the membrane switch panel, and the transmitter comprises a transmitter circuit board in the circuit housing.

50. The remote control of claim 45 wherein the antenna comprises an antenna loop.

51. A wireless remote control for a trolling motor system including a trolling motor for mounting on a boat for controlling propulsion of the boat and a user control having input devices actuable by users to command operation of the trolling motor, the remote control comprising:

a transmitter operatively associated with the user control, the transmitter transmitting a through the air signal responsive to actuation of the input devices;

a receiver operatively associated with the trolling motor for receiving through the air signals from the transmitter and controlling the trolling motor in accordance with information contained in the signal, the receiver including indicator means for indicating if a signal is received from the transmitter.

52. The remote control of claim 51 wherein the indicating means comprises a visual indicator.

53. The remote control of claim 51 wherein the indicating means comprises a light.

54. The remote control of claim 51 wherein the indicating means comprises an LED.

55. The remote control of claim 51 wherein the trolling motor includes a control head housing the receiver and the indicating means is mounted in the control head.

56. The remote control of claim 55 wherein the indicating means comprises a visual indicator.

57. The remote control of claim 55 wherein the indicating means comprises a light.

58. The remote control of claim 55 wherein the indicating means comprises an LED.

59. A wireless remote control for a trolling motor system including a trolling motor for mounting on a boat for controlling propulsion of the boat and a user control having input means for receiving commands to command operation of the trolling motor, the remote control comprising:

a transmitter operatively associated with the user control, the transmitter transmitting a through the air signal responsive to user commands;

a receiver operatively associated with the trolling motor for receiving through the air signals from the transmitter and controlling the trolling motor in accordance with the user commands, the receiver including indicator means for indicating if command is received by the input means.

60. The remote control of claim 59 wherein the indicating means comprises a visual indicator.

61. The remote control of claim 59 wherein the indicating means comprises a light.

62. The remote control of claim 59 wherein the indicating means comprises an LED.

63. The remote control of claim 59 wherein the trolling motor includes a control head housing the receiver and the indicating means is mounted in the control head.

64. In a wireless remote control for a trolling motor system including a foot pedal having input keys and a transmitter transmitting a through the air signal responsive to actuation of the input keys, and a trolling motor for mounting on a boat for controlling propulsion of the boat, the trolling motor including a control head housing a receiver for receiving through the air signals from the transmitter and controlling the trolling motor in accordance with information contained in the signal, the improvement comprising:

indicator means operatively associated with the receiver for indicating if a signal is received from the transmitter.

65. The improvement of claim 64 wherein the indicating means comprises a visual indicator.

66. The improvement of claim 64 wherein the indicating means comprises a light.

67. The improvement of claim 64 wherein the indicating means comprises an LED.

68. A wireless remote control for a trolling motor system including a trolling motor for mounting on a boat for controlling propulsion of the boat and a user control having input devices actuable by users to command operation of the trolling motor, the remote control comprising:

a transmitter operatively associated with the user control, the transmitter transmitting a through the air signal, the signal comprising a status message transmitted periodically if any of the input devices is actuated and for a select time after all of the input devices are deactuated, the status message representing actuation status of the input devices;

a receiver operatively associated with the trolling motor for receiving through the air signals from the transmitter and sending commands to the trolling motor to control the trolling motor in accordance with the actuation status represented in received status messages, the receiver including a timer set each time a status message is received indicating that any input device is actuated and reset if a status message is received indicating that all input devices are deactuated, means for determining if the timer exceeds a select time limit, and cancellation means operable in response to the timer exceeding the select time limit to cancel any commands sent to the trolling motor that any input device is actuated.

69. The remote control of claim 68 wherein select ones of the input devices are operable to maintain an operating condition subsequent to actuation of its associated input device and select others of the input devices are operable to momentarily affect an operating condition only if its associated input device remains actuated.

70. The remote control of claim 69 wherein the cancellation means cancels commands only for the select others of the input devices.

71. The remote control of claim 68 wherein the select time limit is approximately 250 msec.

72. A wireless remote control for a trolling motor system including a trolling motor for mounting on a boat for controlling propulsion of the boat and a user control having input devices actuable by users to command operation of the trolling motor, the remote control comprising:

a transmitter operatively associated with the user control, the transmitter periodically transmitting a through the air signal, the signal comprising a status message transmitted if any of the input devices is actuated and for a select time after all of the input devices are deactuated, the status message representing actuation status of the input devices;

the trolling motor including a receiver having a receiver circuit for receiving through the air signals from the transmitter and sending commands to a control circuit for controlling the trolling motor in accordance with the actuation status represented in received status messages, the receiver circuit including a timer set each time a status message is received indicating that any input device is actuated and reset if a status message is received indicating that all input devices are deactuated, means for determining if the timer exceeds a select time limit, and cancellation means operable in response to the timer exceeding the select time limit to cancel any commands sent to the trolling motor that any input device is actuated.

73. The remote control of claim 72 wherein select ones of the input devices are operable to maintain an operating condition subsequent to actuation of its associated input device and select others of the input devices are operable to momentarily affect an operating condition only if its associated input device remains actuated.

74. The remote control of claim 73 wherein the cancellation means cancels commands only for the select others of the input devices.

75. The remote control of claim 72 wherein the select time limit is approximately 250 msec.

76. A wireless remote control for a trolling motor system including a trolling motor for mounting on a boat for controlling propulsion of the boat and a foot pedal having input keys actuable by users to command speed and steering operation of the trolling motor, the remote control comprising:

a transmitter operatively associated with the foot pedal, the transmitter periodically transmitting a through the air signal, the signal comprising a status message transmitted if any of the input keys is actuated and for a select time after all of the input keys are deactuated, the status message representing actuation status of the input keys;

the trolling motor including a receiver having a receiver circuit for receiving through the air signals from the transmitter and sending steering and speed control commands to a control circuit for controlling the trolling motor in accordance with the actuation status represented in received status messages, the receiver circuit including a timer set each time a status message is received indicating that any input key is actuated and reset if a status message is received indicating that all input keys are deactuated, means for determining if the timer exceeds a select time limit, and cancellation means operable in response to the timer exceeding the select time limit to cancel any steering and speed commands sent to the trolling motor that any input key is actuated.

77. The remote control of claim 76 wherein select ones of the input keys are operable to maintain an operating condition subsequent to actuation of its associated input key and select others of the input keys are operable to momentarily affect an operating condition only if its associated input key remains actuated.

78. The remote control of claim 77 wherein the cancellation means cancels commands only for the select others of the input keys.

79. The remote control of claim 76 wherein the select time limit is approximately 250 msec.

80. The remote control of claim 77 wherein said select others of the input keys include keys to steer the trolling motor in a desired direction.

81. The remote control of claim 77 wherein said select others of the input keys include keys to increase and to decrease speed of the trolling motor.

* * * * *

UNITED STATES PATENT AND TRADEMARK OFFICE
CERTIFICATE OF CORRECTION

PATENT NO. : 6,054,831
DATED : April 25, 2000
INVENTOR(S) : Prentice G. Moore et al.

It is certified that error appears in the above-identified patent and that said Letters Patent is hereby corrected as shown below:

Column 1,
Line 1, insert -- This application is a divisional of co-pending Application Serial No. 08/676,667, filed July 10, 1996. --

Signed and Sealed this

Twenty-ninth Day of June, 2004

JON W. DUDAS
*Acting Director of the United States Patent and Trademark Office*

UNITED STATES PATENT AND TRADEMARK OFFICE

CERTIFICATE OF CORRECTION

PATENT NO. : 6,054,831
DATED : April 25, 2000
INVENTOR(S) : Prentice G. Moore et al.

It is certified that error appears in the above-identified patent and that said Letters Patent is hereby corrected as shown below:

<u>Column 1,</u>
Line 3, insert -- This application is a divisional of copending application Serial No. 08/676,667, filed July 10, 1996, which application claims the benefit of copending provisional application Serial No. 60/001,074, filed July 12, 1995. --.

Signed and Sealed this

Twenty-seventh Day of December, 2005

JON W. DUDAS
*Director of the United States Patent and Trademark Office*